United States Patent
Kawai et al.

(10) Patent No.: US 10,191,460 B2
(45) Date of Patent: Jan. 29, 2019

(54) CONTROL DEVICE FOR MACHINE TOOL

(71) Applicant: MAKINO MILLING MACHINE CO., LTD., Tokyo (JP)

(72) Inventors: Rie Kawai, Aiko-gun (JP); Hideki Heishi, Aiko-gun (JP); Kenichi Ono, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/318,932

(22) PCT Filed: Jun. 19, 2014

(86) PCT No.: PCT/JP2014/066315
§ 371 (c)(1),
(2) Date: Dec. 14, 2016

(87) PCT Pub. No.: WO2015/194011
PCT Pub. Date: Dec. 23, 2015

(65) Prior Publication Data
US 2017/0131692 A1     May 11, 2017

(51) Int. Cl.
*G05B 19/042* (2006.01)
*G05B 19/4063* (2006.01)
(Continued)

(52) U.S. Cl.
CPC ......... *G05B 19/042* (2013.01); *G05B 19/409* (2013.01); *G05B 19/4063* (2013.01);
(Continued)

(58) Field of Classification Search
CPC .............. G05B 19/042; G05B 19/4063; G05B 19/4068; G05B 19/409;
(Continued)

(56) References Cited

U.S. PATENT DOCUMENTS

2006/0047704 A1    3/2006  Gopalakrishnan
2007/0097098 A1*   5/2007  Yoshino .............. G06F 3/04883
                                                345/179
(Continued)

FOREIGN PATENT DOCUMENTS

CN     1637672     7/2005
EP     0 089 562   9/1983
(Continued)

OTHER PUBLICATIONS

International Search Report dated Sep. 2, 2014, directed to International Application No. PCT/JP2014/066315, 2 pages.

*Primary Examiner* — Abdelmoniem I Elamin
(74) *Attorney, Agent, or Firm* — Morrison & Foerster LLP

(57) ABSTRACT

A control device for a machine tool that moves a tool relative to a workpiece and/or vice versa and machines said workpiece. Said control device is provided with a display unit that displays information related to the machine tool, a first-layer generation unit that generates a first layer that contains machining information related to the machining being performed on the workpiece, and a second-layer generation unit that generates a second layer that contains an image or handwritten note related to the machining information in the first layer. The display unit displays an image consisting of the second layer superimposed onto the first layer.

4 Claims, 18 Drawing Sheets

(51) Int. Cl.
  *G05B 19/409* (2006.01)
  *G06F 3/14* (2006.01)
  *G09G 5/14* (2006.01)
  *G06F 3/147* (2006.01)
  *G05B 19/4068* (2006.01)

(52) U.S. Cl.
  CPC ............ *G05B 19/4068* (2013.01); *G06F 3/14* (2013.01); *G06F 3/147* (2013.01); *G09G 5/14* (2013.01); *G05B 2219/23186* (2013.01); *G05B 2219/25293* (2013.01); *G09G 2340/10* (2013.01); *G09G 2340/12* (2013.01); *G09G 2354/00* (2013.01)

(58) Field of Classification Search
  CPC .......... G05B 2219/23186; G05B 2219/25293; G06F 3/14; G06F 3/147; G09G 2340/10; G09G 2340/12; G09G 2354/00; G09G 5/14
  See application file for complete search history.

(56) References Cited

U.S. PATENT DOCUMENTS

| | | | | | |
|---|---|---|---|---|---|
| 2010/0063617 | A1* | 3/2010 | Mori | ............... | B23Q 17/20 700/175 |
| 2010/0305758 | A1* | 12/2010 | Nishi | ............... | B23Q 17/00 700/264 |
| 2013/0076287 | A1* | 3/2013 | Iwashita | ............ | G05B 19/4068 318/561 |
| 2013/0338809 | A1* | 12/2013 | Kume | ............... | G05B 19/4155 700/97 |
| 2013/0338814 | A1* | 12/2013 | Uchida | ............... | G05B 19/18 700/180 |
| 2014/0022086 | A1* | 1/2014 | Tezuka | ............... | B23Q 17/00 340/680 |
| 2014/0100688 | A1* | 4/2014 | Tezuka | ............... | G05B 19/404 700/186 |
| 2014/0152543 | A1* | 6/2014 | Hirabayashi | ......... | G06F 3/1462 345/156 |
| 2014/0212042 | A1* | 7/2014 | Shibata | ............... | G06F 3/03545 382/188 |
| 2014/0244024 | A1* | 8/2014 | Tezuka | ............... | G05B 19/188 700/180 |
| 2014/0372881 | A1* | 12/2014 | Aikawa | ............... | G06F 17/24 715/268 |
| 2014/0380225 | A1* | 12/2014 | Fujiwara | ............ | G06F 3/04855 715/776 |
| 2015/0095798 | A1* | 4/2015 | Yang | ............... | G06F 3/1454 715/751 |
| 2016/0154474 | A1* | 6/2016 | Park | ............... | G06F 3/03545 345/173 |
| 2017/0024122 | A1* | 1/2017 | Jung | ............... | G06F 3/04883 |
| 2017/0293826 | A1* | 10/2017 | Kemmochi | ............... | G06K 9/72 |
| 2018/0059886 | A1* | 3/2018 | Matsuda | ............... | G06F 3/0482 |

FOREIGN PATENT DOCUMENTS

| | | |
|---|---|---|
| EP | 1 548 529 | 6/2005 |
| EP | 2 521 109 | 11/2012 |
| JP | 6-168019 | 6/1994 |
| JP | 7-308878 | 11/1995 |
| JP | 8-106315 | 4/1996 |
| JP | 2007-242054 | 9/2007 |
| JP | 2009-193568 | 8/2009 |

\* cited by examiner

CONTROL DEVICE FOR MACHINE TOOL

CROSS-REFERENCE TO RELATED APPLICATIONS

This application is a U.S. National Stage patent application of International Patent Application No. PCT/JP2014/066315, filed Jun. 19, 2014, which is hereby incorporated by reference in the present disclosure in its entirety.

FIELD OF THE INVENTION

The present invention relates to a control device of a machine tool.

BACKGROUND OF THE INVENTION

In a conventional technique, machine tools which perform machining such as cutting by moving a tool with respect to a workpiece are known. Moreover, in such machine tools, a numerical control-type machine tool which specifies a tool path using coordinates of a predetermined feed axis or the like and performs machining by moving the tool with respect to the workpiece is known. Machining can be automatically performed by moving at least one of the workpiece and the tool in accordance with a command from a control device of the machine tool and thereby changing a relative position of the tool with respect to the workpiece.

In the numerical control-type machine tool, machining is performed based on a machining program in which the relative position of the tool with respect to the workpiece is determined. The control device of the machine tool controls the relative position of the tool with respect to the workpiece based on the machining program. To automatically perform machining of the workpiece by the machine tool, setting in advance machining information on machining such as the machining program is needed. The control device is formed in such a manner as to be capable of inputting the machining information.

Japanese Unexamined Patent Publication No. H8-106315A discloses an NC device which inputs data as desired by handwriting characters, figures, and the like on a panel surface of a touch panel, determines whether such input data is information data or function command data, and displays the information data as handwritten at a desired position of the touch panel.

CITATION LIST

Patent literature 1: Japanese Unexamined Patent Publication No. H8-106315A

SUMMARY OF THE INVENTION

The machining information on machining includes various information in addition to the machining program. The programmer who has generated the machining program and the supervisor who supervises an operation by the machine tool transmit the machining information to be set in the machine tool to the operator. The operator who operates the machine tool needs to input the machining information to the control device and confirm the machining information as already inputted to the control device before starting machining of the workpiece. Inputting and confirming the machining information can be performed while observing a picture displayed on a display part of the control device.

However, if an image displaying the machining information is composed of characters and numbers, there have been cases in which the content of items of the machining information is not easily understood. In addition, it has been feared that a time to understand the machining information as displayed becomes longer and a misunderstanding occurs.

For example, in a picture for setting a workpiece coordinate system, inputting a reference point on the workpiece to a predetermined location is needed with respect to a plurality of workpiece coordinate systems. If the picture is composed of only characters and numbers, there has been a problem that understanding the reference point on the workpiece is difficult. In a process of orally transmitting a position of the reference point on the workpiece to the operator, it is feared that the content to be transmitted fails to be fully communicated and the operator has a misunderstanding. Further, it has been feared that also when the content to be transmitted is described on a paper, which is provided to the operator, a loss and a confusion of the paper and the like occur and matters to be transmitted from the programmer and the supervisor to the operator are not correctly transmitted.

It is an object of the present invention to provide a control device of a machine tool which displays a screen which facilitates understanding of the operator.

The control device of the machine tool according to the present invention is a control device of a machine tool which machines a workpiece by relatively moving a tool and the workpiece, and comprises a display part which displays information associated with a machine tool, a first layer generation part which generates a first layer containing machining information associated with machining of the workpiece, and a second layer generation part which generates a second layer containing an image or a handwritten note associated with the machining information of the first layer. The display part displays an image in which the second layer is superposed on the first layer.

In the invention as described above, it is possible that a third layer generation part which generates a third layer is provided, the second layer generation part is formed in such a manner as to generate the second layer containing an image generated in advance, the third layer generation part is formed in such a manner as to generate a handwritten note, and the display part superposes an image obtained by superposing the second layer and the third layer on the first layer and displays the image.

In the invention as described above, it is possible that a storage part which individually stores the second layer and the third layer is provided, and the third layer generation part reads the third layer from the storage part and is formed to be capable of editing the handwritten note of the third layer.

In the invention as described above, it is possible that the first layer generation part is formed in such a manner as to generate an image containing a plurality of coordinate systems as the machining information, and the display part displays the second layer so as to correspond to each of the coordinate systems of the first layer.

In the invention as described above, it is possible that the machining information includes at least one of a machining program, a number for specifying the machining program, a reference point of a workpiece coordinate system, tool information, and a workpiece inspection item.

In the invention as described above, it is possible that the second layer generation part is formed to be capable of inputting the handwritten note into the second layer, and the display part displays the second layer while superposing the second layer on an arbitrary picture of the first layer through an operation by an operator.

In the invention as described above, it is possible that an image capture device disposed to be capable of capturing the workpiece or the tool is provided and the second layer generation part takes an image from the image capture device and inputs the image into the second layer.

According to the present invention, the control device of the machine tool which displays a screen which facilitates understanding of the operator can be provided.

DETAILED DESCRIPTION OF THE INVENTION

With reference to FIG. 1 to FIG. 14, a control device of a machine tool according to first embodiment will be described. A machine tool according to the present embodiment is a numerical control-type in which machining is performed by relatively moving a tool and a workpiece based on a machining program.

Figure 1:
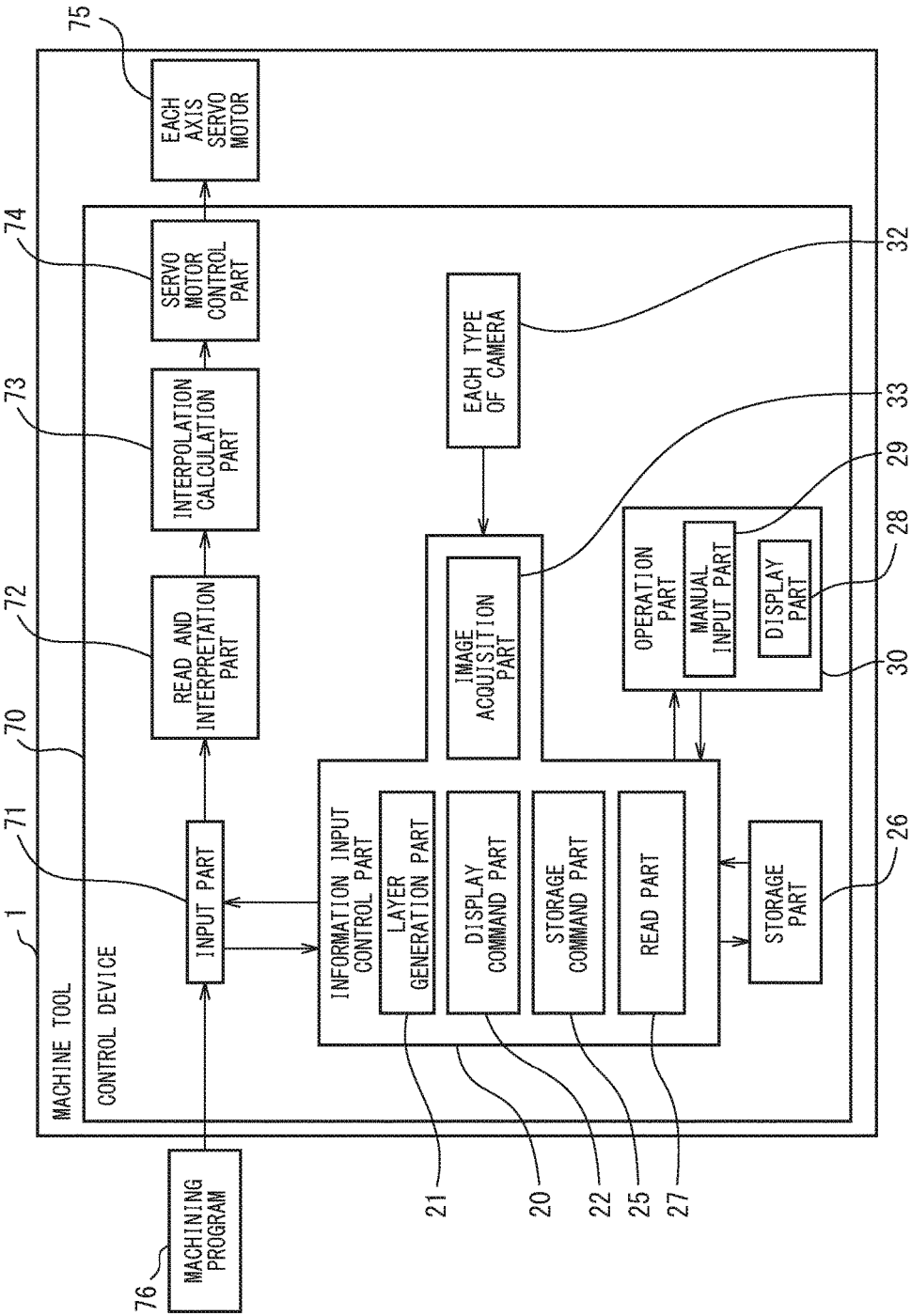
FIG. 1 is a block diagram of a machine tool according to an embodiment.

FIG. 1 shows a block diagram of the machine tool according to the present embodiment. A machine tool 1 includes a control device 70 which performs a control of a movement device of each feed axis and a setting of information associated with the machine tool. The control device 70 is configured, for example, by a CPU (central processing unit), a RAM (random access memory), ROM (a read only memory), and the like which are connected to one another via a bus.

The control device 70 includes an input part 71, a read and interpretation part 72, an interpolation calculation part 73, and a servo motor control part 74. When machining is performed by the numerical control-type machine tool 1, a machining program 76 is prepared in advance. The machining program 76 is generated by the operator called programmer. The machining program 76 can be generated based on a workpiece target shape by a CAM (computer aided manufacturing) device or the like. The workpiece target shape can be created, for example, by a CAD (computer aided design) device. Note that the operator who generates the machining program 76 and the operator who operates the machine tool may be the same.

The machining program 76 is inputted into the input part 71. The machining program 76 contains information on a relative movement of the tool with respect to the workpiece. In the machining program 76, a command toward the machine tool is described by a G code, an M code, and the like.

The read and interpretation part 72 reads the machining program 76 and the like from the input part 71. The read and interpretation part 72 transmits a movement command to the interpolation calculation part 73. The interpolation calculation part 73 calculates a position command value for each interpolation cycle. For example, the interpolation calculation part 73 calculates a movement amount for each time interval as set based on the movement command. The interpolation calculation part 73 transmits the position command value to the servo motor control part 74. The servo motor control part 74 calculates a movement amount of each feed axis such as X axis, Y axis, and Z axis, based on the position command and drives each axis servo motor 75.

The machine tool 1 performs machining based on machining information associated with machining of the workpiece. As the machining information, for example, tool information associated with the tool, coordinate information associated with coordinates, and inspection information associated with inspection of the workpiece as machined are included in addition to the machining program 76 as described above. For example, the coordinate information includes information on coordinates used in the machining program 76. Coordinate systems of the machine tool include a machine coordinate having a predetermined point of the machine tool as the origin. On the other hand, there are cases in which a workpiece coordinate having an arbitrary point of the workpiece as the origin is set. When an attachment position of the workpiece in the machine tool 1 is moved, the workpiece coordinate is changed in accordance with the attachment position of the workpiece. The workpiece coordinate can be determined by setting a relative position with respect to the machine coordinate. The coordinate information includes information on another coordinate different from the machine coordinate. Further, when a plurality of coordinates are used in the machining program 76, information on such a plurality of coordinates is included in the coordinate information.

The control device 70 according to the present embodiment includes an information input control part 20 and an operation part 30 which inputs and displays the machining information. The information input control part 20 transmits the machining information for performing machining at this time to the input part 71. The operation part 30 includes a display part 28 which displays information associated with the machine tool and a manual input part 29 for inputting and editing the machining information by the operator. The information input control part 20 can, for example, edit the machining program 76 inputted into the input part 71 and transmit the program as the machining program of machining at this time to the input part 71. The control device 70 includes a storage part 26 which stores predetermined information, such as the machining information. The storage part 26 may be a storage device such as a memory card and a hard disk which is connected via a communication interface in addition to the ROM and the RAM as described above.

The information input control part 20 includes a storage command part 25 and a read part 27. The storage command part 25 allows the storage part 26 to store the machining information as newly inputted and the machining information as edited. The read part 27 reads the machining information stored in the storage part 26. The information input control part 20 includes a layer generation part 21 and a display command part 22. The layer generation part 21 generates an image to be displayed on the display part 28. The display command part 22 transmits a command for displaying the image generated by the layer generation part 21 to the display part 28. The display part 28 displays the image based on the command from the display command part 22.

The control device 70 according to the present embodiment includes each type of camera 32 as an image capture device. The information input control part 20 includes an image acquisition part 33. The image acquisition part 33 acquires an image by each type of camera 32 and transmits the image to the layer generation part 21.

Figure 2:
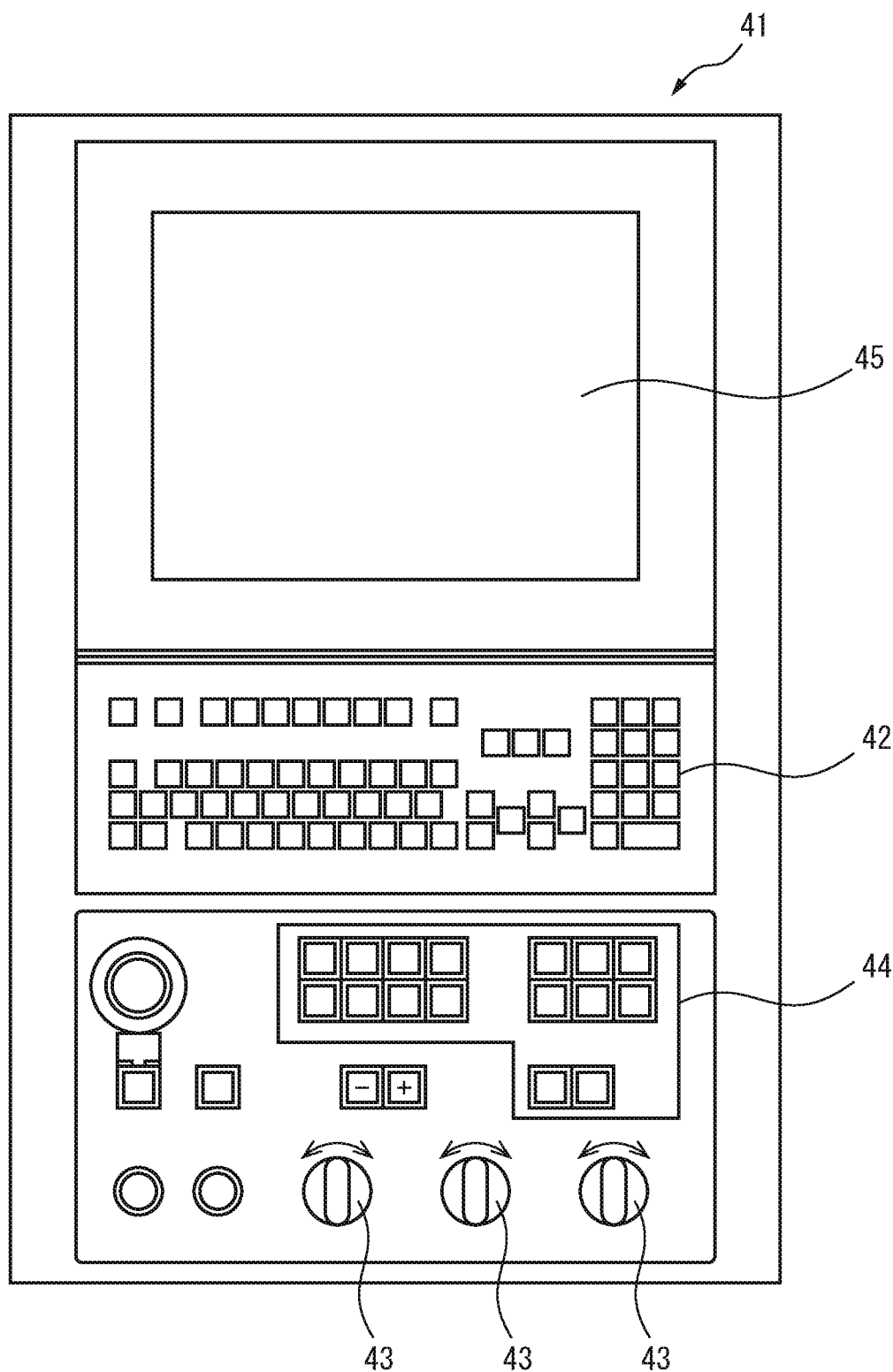
FIG. 2 is a schematic front view of an operation panel of the machine tool according to the embodiment.

FIG. 2 shows a front view of an operation panel disposed in the control device of the machine tool. With reference to FIG. 1 and FIG. 2, an operation panel 41 corresponds to the operation part 30 of the control device 70. The operation panel 41 includes a display panel 45 with which display of the machining information and input of the machining information are performed. For the display panel 45 according to the present embodiment, a touch panel type capable of selecting a desired section by touching a screen is employed. Accordingly, the display panel 45 according to the present embodiment functions as the display part 28 and the manual input part 29 of the control device 70.

The operation panel 41 includes a key input part 42. In the key input part 42, a plurality of key switches are arranged. By pushing the key switches of the key input part 42, predetermined numbers and characters can be inputted. Further, the operation panel 41 includes an operation switch part 44 which performs selection of a predetermined operation and an override setting part 43 which sets an override value. The override setting part 43 can set, for example, an override value of a rotational speed of a spindle, an override value of a feed rate of machining, and the like. The key input part 42, the operation switch part 44, the override setting part 43, and the like function as the manual input part 29.

Figure 3:
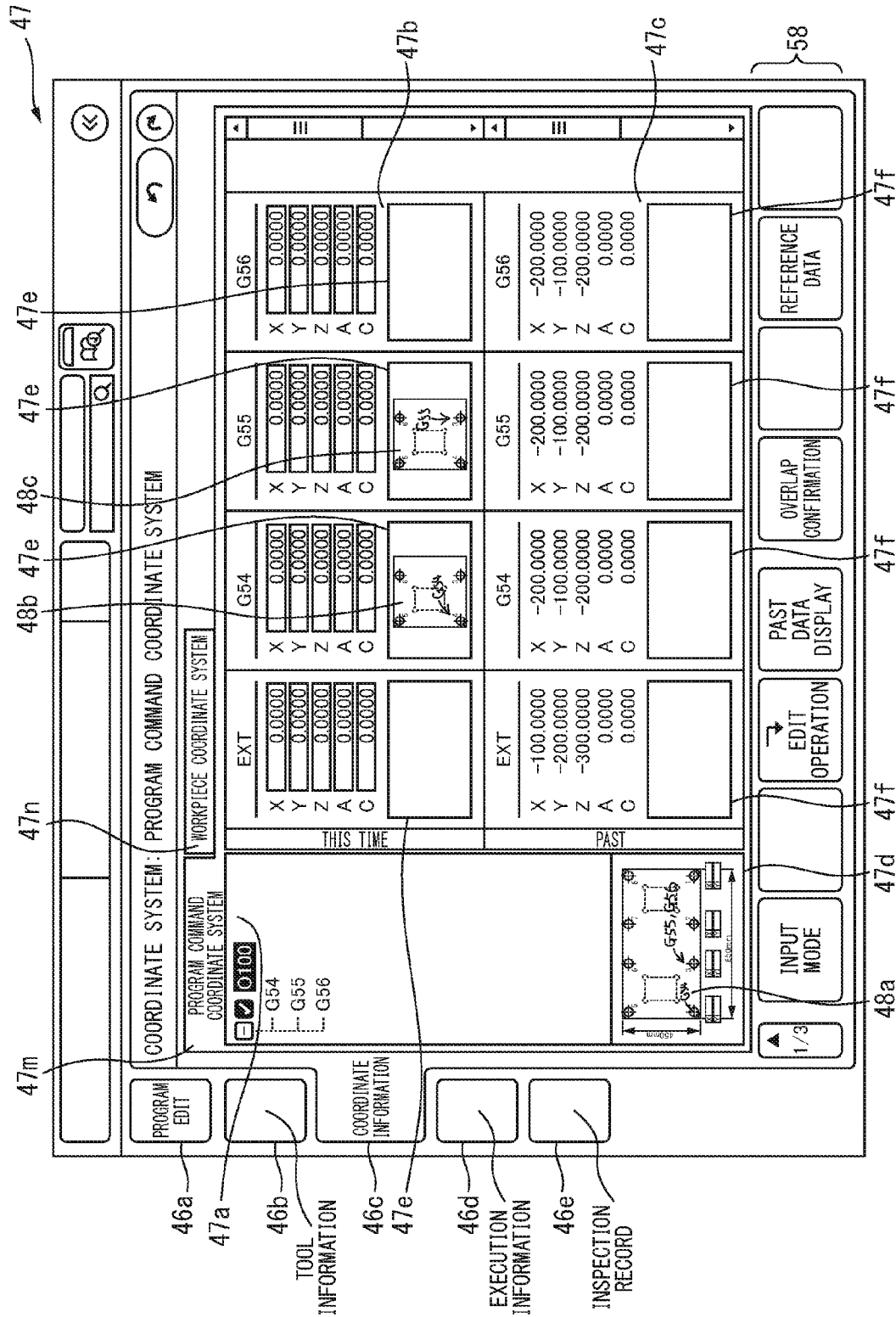
FIG. 3 is an explanatory diagram of a coordinate information picture according to first embodiment.

FIG. 3 shows a coordinate information picture among pictures displayed on a display panel. A coordinate information picture 47 is a picture for displaying and editing the coordinate information. On the left side of the picture, tabs 46a-46e for selecting a display content are arranged. In an example herein, by selecting the tab 46c, the coordinate information picture 47 is displayed. In a lower side area of the coordinate information picture 47, a button area 58 is formed. In the button area 58, buttons for performing a predetermined operation are arranged. Herein, the tab 47m is selected between a tab 47m for displaying the coordinate systems used in the program and a tab 47n for displaying every stored workpiece coordinate system.

The coordinate information picture 47 includes a display area 47a for displaying a list of the coordinate systems used in the machining program. In the example herein, in a machining program O100, a G54 coordinate system, a G55 coordinate system, and a G56 coordinate system are used. The G54 coordinate system, the G55 coordinate system, and the G56 coordinate system are the workpiece coordinate systems. In a display area 47b, information of each coordinate system for performing machining at this time is displayed. In a display area 47c, information of past coordinate systems used when machining has been performed in accordance with the machining program O100 at a previous time is displayed for reference. In the display area 47b, a configuration is made in such a manner that numerical values with respect to a reference point of each axis such as the X axis and the Y axis can be inputted. Further, in a column of a correction value EXT, a numerical value for uniformly making a correction to all workpiece coordinates can be inputted.

An image area 47d is displayed on the display area 47a. In the image area 47d, a description image 48a is displayed. Further, an image area 47e is displayed at a lower part of each coordinate system in the display area 47b. The image area 47e is displayed for each coordinate system. In the example herein, in the image area 47e of the G54 coordinate system, a description image 48b is displayed. In the image area 47e of the G55 coordinate system, a description image 48c is displayed.

Thus, in the present embodiment, one description image is displayed for one coordinate system. An image associated with each coordinate system can be displayed. For example, a description image which displays a reference point of each coordinate system can be posted.

Further, the image area 47d is displayed also in the display area 47a for selecting the machining program. As the description image 48a posted at the image area 47d, for example, the description image 48a which indicates positions of reference points of the plurality of coordinate systems can be displayed. In the example herein, the machining program O100 is selected and the description image 48a corresponding to the machining program O100 is displayed in the image area 47d. In the display area 47a, when another machining program is selected, a description image associated with the machining program as selected is displayed.

Thus, description images 48a-48c are displayed in columns which display the coordinate systems so that the operator can easily grasp the reference points of the coordinate system by observing the description images. A numerical value of each axis of each coordinate system can be inputted based on the positions of the reference points indicated in the description images 48a-48c.

The operator can correctly understand the positions of the reference points of the coordinate systems without writing down the positions of the reference points of the respective coordinate systems on the form or being provided with the positions of the reference points of the coordinate systems from the supervisor or the programmer. The supervisor and the programmer can in advance create the description images 48a-48c with respect to the reference point of each coordinate system and allow the storage part 26 of the control device 70 to store the same. Alternatively, the operator who has started machining creating the description images 48a-48c and allowing the storage part 26 to store the same, whereby handing over an operation can be easily performed also when the operator is changed.

Further, the content of the machining program can be easily distinguished without confirming machining program internals by displaying the description image 48a in the display area 47a for selecting the machining program. Accordingly, a time to select the machining program is reduced. In addition, an error in selecting the machining program can be suppressed.

In the description as described above, an example in which the positions of the reference points of the coordinate systems are displayed is described as the description images, but a configuration is not limited to the aspect, and an arbitrary image which facilitates understanding of the operator can be employed as the description images. For example, in the image area 47d disposed in the display area 47a, a drawing of the workpiece as finished, a cubic diagram of the workpiece and the tool, a photograph of the workpiece, a photograph of a jig which handles the workpiece, or a description image of a handwritten note can be displayed.

Note that in the coordinate information picture 47, a configuration is made in such a manner that by selecting any of the description images 48a-48c, the description images 48a-48c can be enlarged. The description images 48a-48c can be viewed in detail.

Next, a method of displaying a description images of the control device will be described. When each of the tabs 46a-46e is selected, the control device generates a first layer containing the machining information corresponding to an item of the tabs. The first layer is a base layer. The first layer contains an image from which an image area is excluded. In the first layer, an area in which, if necessary, the operator inputs a numerical value and the like is formed.

The control device generates a second layer containing an image associated with the machining information in the first layer. The control device generates a third layer containing a handwritten note associated with the second layer. An image in which the second layer and the third layer are superposed is superposed on the first layer to be displayed. The image in which the second layer and the third layer are superposed serves as a description image. The third layer in a state in which a background is transparent is superposed on the second layer. In the present embodiment, the description image is displayed in the image area formed on the first layer. The image in which the second layer and the third layer are superposed is displayed to be smaller than the first layer.

Figure 4:
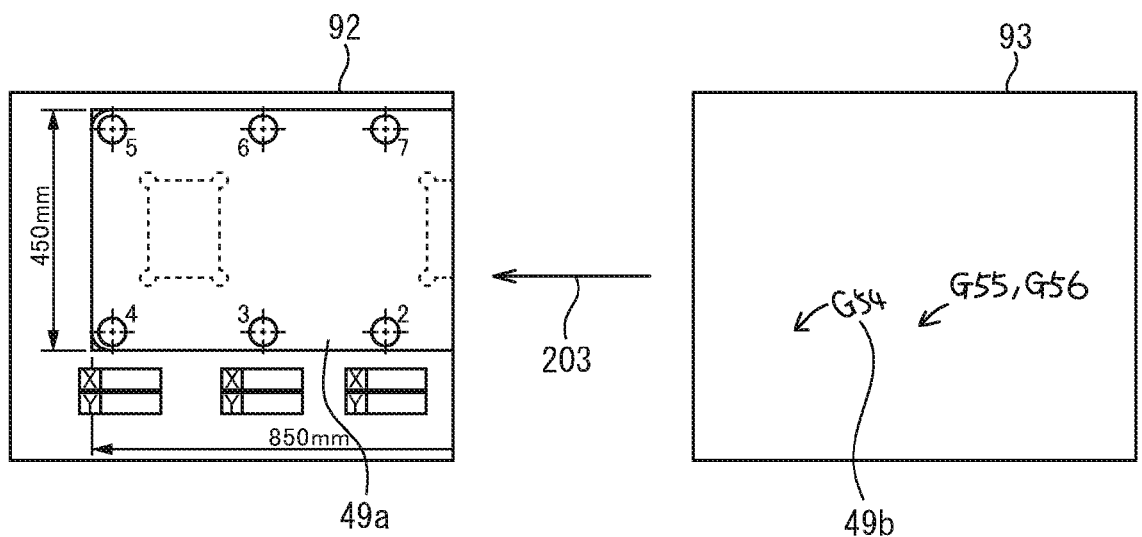
FIG. 4 is an explanatory diagram of an image of a second layer and an image of a third layer.

FIG. 4 shows an explanatory diagram of the second layer and the third layer. Herein, the description image 48a displayed in the image area 47d on the first layer will be described. A second layer 92 contains a figure image 49a of the workpiece as inputted in advance. A third layer 93 contains a character image 49b indicating the workpiece coordinate systems in a handwritten manner. In such a state, the third layer 93 is superposed on the second layer 92 as indicated by an arrow 203.

Figure 5:
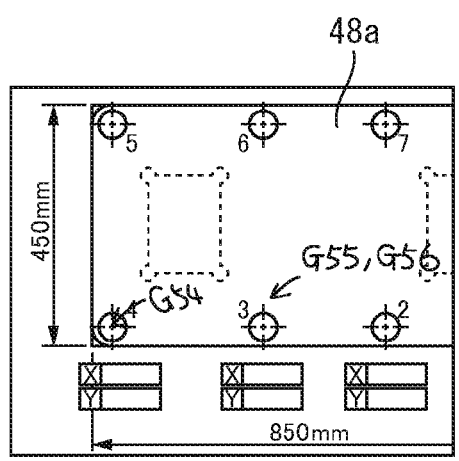
FIG. 5 illustrates an image as displayed in which the third layer is superposed on the second layer.

FIG. 5 shows an image in which the second layer and the third layer are superposed. The second layer 92 and the third layer 93 are superposed with one another to be displayed, whereby the description image 48a to which the figure image 49a and the character image 49b are illustrated is generated. In an example of the description image 48a as illustrated in FIG. 5, the center of a hole of number 4 serves as a reference point of the G54 coordinate system and the center of a hole of number 3 serves as a reference point of the G55 coordinate system and the G56 coordinate system.

Figure 6:
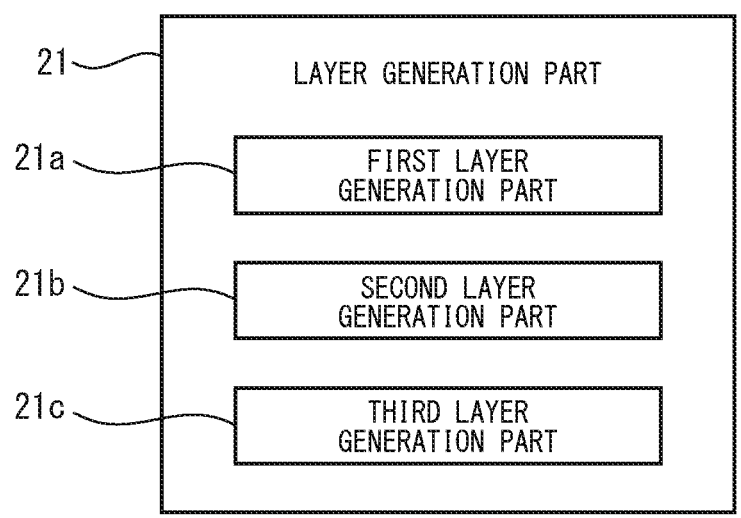
FIG. 6 is a block diagram of a layer generation part of a control device.

FIG. 6 shows a block diagram of the layer generation part of the present embodiment. With reference to FIG. 1 and FIG. 6, the layer generation part 21 of the information input control part 20 generates each layer. The layer generation part 21 includes a first layer generation part 21a which generates the first layer as the base layer. The first layer generation part 21a is formed in such a manner as to be capable of generating the first layer by taking in a predetermined format from the storage part 26. The layer generation part 21 includes a second layer generation part 21b which generates the second layer. The second layer generation part 21b generates the second layer by taking in second layer information stored in the storage part 26. Further, as described below, the second layer generation part 21 is formed in such a manner as to be capable of inputting an image into the second layer using an image such as a drawing and a photograph as generated in advance.

The layer generation part 21 includes a third layer generation part 21c which generates the third layer. The third layer generation part 21c generates the third layer by taking in third layer information stored in the storage part 26. Further, as described below, the third layer generation part 21c is formed in such a manner as to be capable of inputting an image of a figure, a character, and the like as inputted by the operator using handwriting into the third layer.

The display command part 22 transmits a command for displaying the first layer generated by the first layer generation part 21a to the display part 28 of the operation part 30. The display command part 22 commands the display part 28 of the operation part 30 so as to superpose the image in which the third layer is superposed on the second layer, on the first layer and display the same. The display part 28 displays the image based on the commands from the display command part 22.

Thus, in the present embodiment, a description image can be displayed on a predetermined picture. Next, another picture displayed on the display panel 45 will be also described by way of example.

Figure 7:
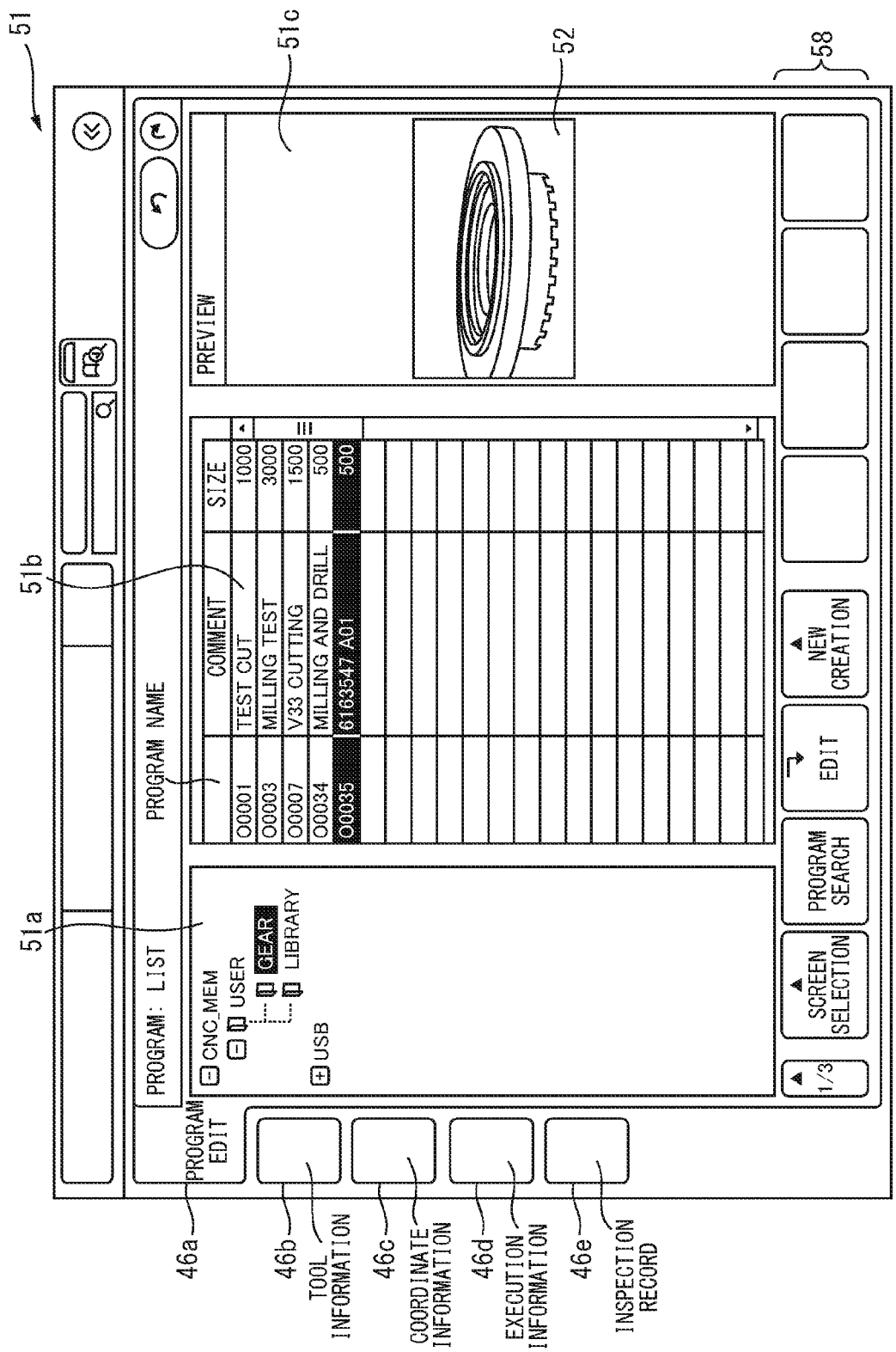
FIG. 7 is a program edit picture according to the embodiment.

FIG. 7 illustrates a program edit picture according to the present embodiment. A program edit picture 51 can be displayed by selecting the program edit tab 46a. The program edit picture 51 is a picture for creating, displaying, and editing the machining program. The program edit picture 51 includes a display area 51a for selecting the content of machining and a display area 51b in which a list of the machining program needed for the content of machining as selected is displayed. In the display area 51b, numbers for specifying the machining program such as O0001, O0003, and O0007 are displayed. An image displayed in the display areas 51a, 51b is generated in the first layer. Further, an image area 51c is disposed on the first layer of the program edit picture 51. In the image area 51c, a description image 52 is displayed.

When the machining program as predetermined is selected in the display area 51b, the description image 52 associated with the machining program as selected is displayed in the image area 51c. In FIG. 7, the machining program as specified by a number O0035 is selected. The description image 52 herein is a cubic diagram (perspective view) of the workpiece which has undergone machining in accordance with the machining program O0035. The operator can easily grasp the content of machining without confirming the machining program internals. In other words, reference to the description image 52 can be made at the time when the content of the machining program is confirmed.

In the program edit picture 51, the description image 52 is contained in the second layer. The second layer is superposed on the first layer to be displayed. The description image of the second layer is displayed to be smaller than the first layer. As the image displayed in the image area 51c, the image is not limited to the cubic diagram, and an arbitrary image which facilitates understanding of the content of the machining program can be employed. For example, a photograph of the workpiece, a photograph of the tool, a photograph of a jig which handles the workpiece, a drawing of the workpiece and the tool, a cubic diagram of the workpiece and the tool, and an image such as a handwritten note and a progress schedule can be displayed. Alternatively, a plurality of images may be displayed in the image area 51c. In the program edit picture 51, the second layer generation part 21b generates the second layer containing the description image 52, and the display command part 22 transmits a command of displaying the image, in which the second layer is superposed on the first layer, to the display part 28.

In the program edit picture 51 according to the present embodiment, the third layer is not used, but a configuration is not limited to the aspect, and the third layer generation part 21c may generate the third layer and a description image in which the second layer and the third layer are superposed may be displayed.

Figure 8:
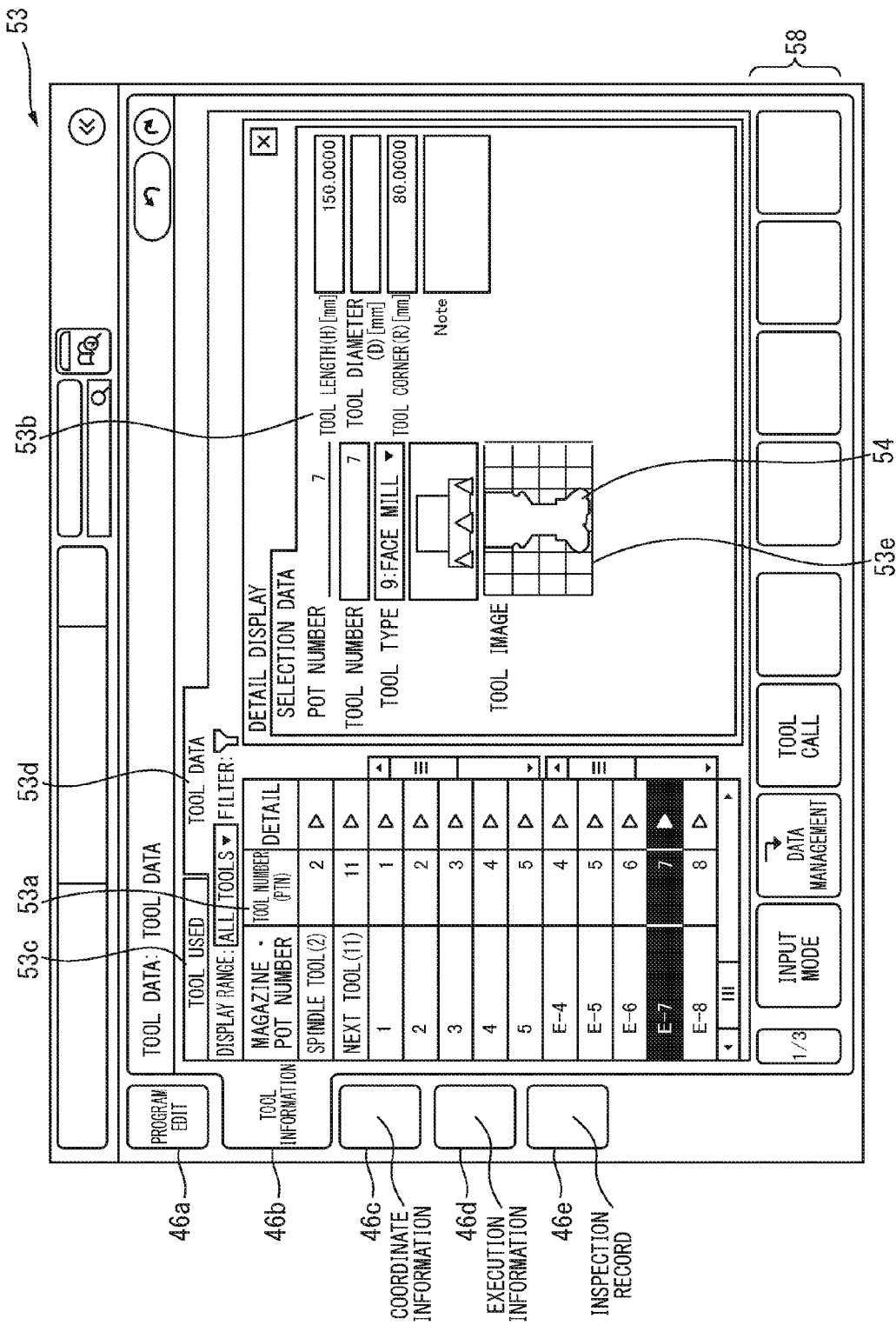
FIG. 8 is a tool information picture according to the embodiment.

FIG. 8 shows a tool information picture according to the present embodiment. A tool information picture 53 can be displayed by selecting the tool information tab 46b. The tool information picture 53 is a picture for inputting, displaying, and editing the tool information. The tool information picture 53 includes a tab 53c for selecting a picture for displaying a tool used for machining at this time and a tab 53d for selecting a picture for displaying and editing information of each too In an example as illustrated in FIG. 8, the tab 53d is selected. The tool information picture 53 displays information on the tool, which is a number of the tool such as a drill and an end mill, a tool type, a tool diameter, a tool length, and the like.

The tool information picture 53 includes a display area 53a for selecting the tool and a display area 53b for displaying and editing detailed information of the tool as selected in the display area 53a. An image in the display areas 53a, 53b is generated in the first layer. An image area 53e is disposed on the display area 53b. On the tool information picture 53, the description image 54 is included in the second layer. In the image area 53e, a description image 54 is displayed.

The description image 54 is an image associated with the tool as selected in the display area 53a. In the present embodiment, one description image can be displayed with respect to one tool. For example, as the description image, a photograph of the tool and an image of a drawing, a cubic diagram, or the like can be employed. Further, the tool information such as description of a mounting direction of a throwaway tip can be included in the third layer by handwriting. By observing the description image 54, the operator can easily understand the type of the tool used for machining, and the like, and perform an operation of preparing the tool. Note that also in the tool information picture 53, the description image 54 can be enlarged by pushing the description image 54.

In the tool information picture 53, the second layer generation part 21b can generate the second layer containing the description image 54, and the display command part 22 can transmit a command of displaying the image, in which the second layer is superposed on the first layer, to the display part 28.

Figure 9:
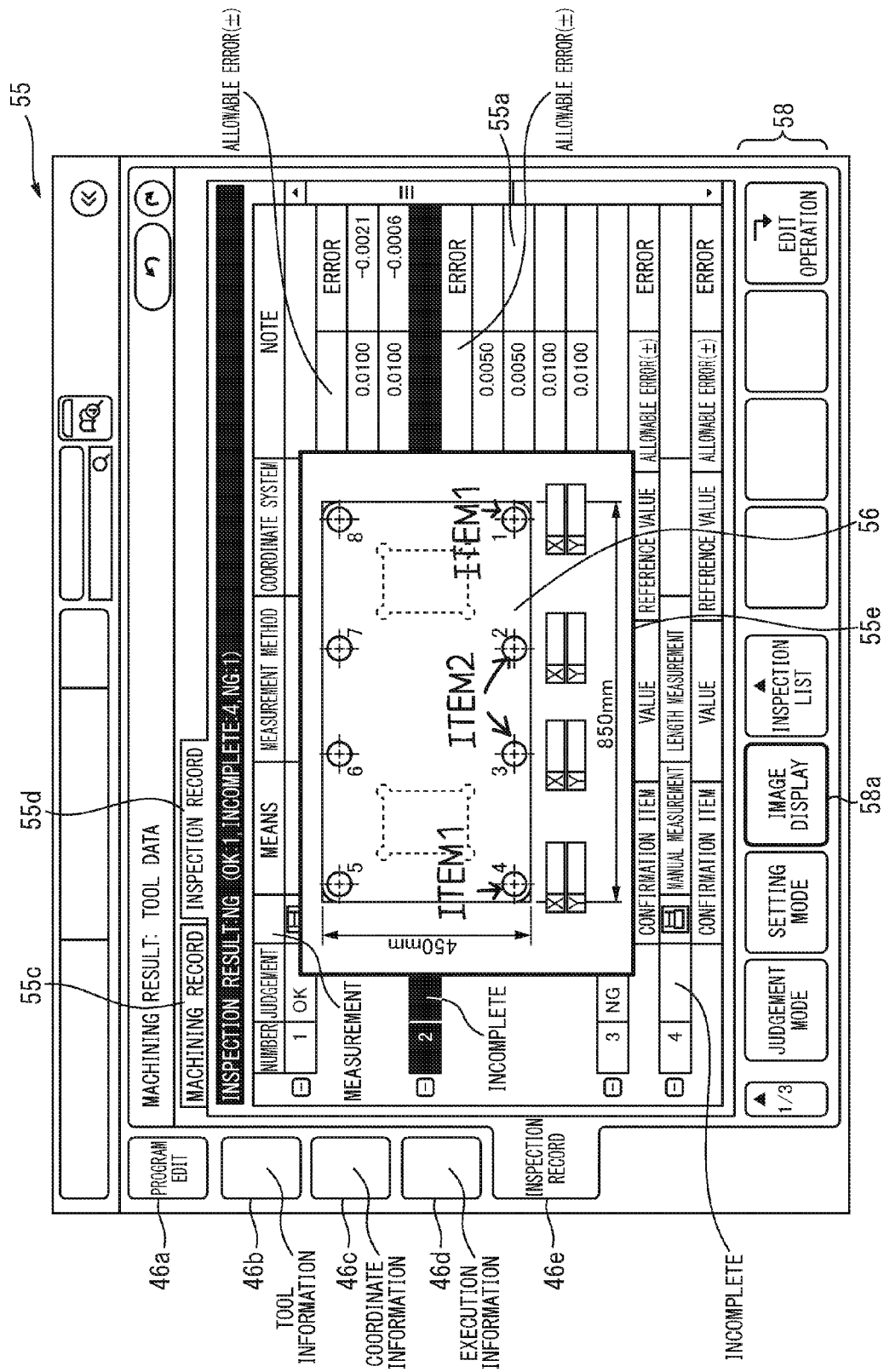
FIG. 9 is an inspection record picture according to the embodiment.

FIG. 9 shows an inspection record picture according to the present embodiment. By selecting the inspection record tab 46e, an inspection record picture 55 can be displayed. The inspection record picture 55 is a picture for inputting, displaying, or editing information on inspection performed in the machine tool. The inspection record picture 55 includes a tab 55c for displaying a record of a machining process and a tab 55d for displaying a record obtained by performing inspection of the workpiece by the machine tool. In an example as illustrated in FIG. 9, the tab 55d is selected.

The inspection record picture 55 includes a display area 55a for displaying inspection items and inspection results. A picture in which the inspection items and the inspection results are described is generated in the first layer. In the inspection record picture 55, an image area 55e is displayed by pushing a button 58a disposed in the button area 58 for displaying a description image. In the image area 55e, a description image 56 is displayed.

The description image 56 is an image in which the second layer and the third layer are combined. In the description image 56, the second layer contains a drawing of a plan view of the workpiece. The inspection items with respect to each of holes are inputted into the third layer by handwriting. For example, it is indicated that holes of number 1 and number 4 are inspected in terms of an inspection item 1, and holes of number 2 and number 3 are inspected in terms of an inspection item 2. The description image 56 is not limited to such a configuration, and a description image with respect to inspection can be displayed. The operator can easily understand a position of the inspection items on the workpiece by observing the description image.

Thus, in each picture, a description image composed of at least one of the second layer and the third layer is displayed on the first layer containing the machining information, whereby understanding of the operator can be facilitated. In the present embodiment, the program edit picture, the tool information picture, the coordinate information picture, and the inspection record picture have been described by way of example, but a configuration of which is not limitative, and a description image can be displayed on an arbitrary picture.

Thus, the control device according to the present embodiment is formed in such a manner as to superpose an image containing an image of the second layer and an image of the third layer on the first layer and display the image. In other words, an image in which the second layer and the third layer are superposed is superposed on the first layer to be displayed. The information as desired can be written in the third layer by handwriting on the image contained in the second layer. Consequently, understanding of the operator as to a description image can be promoted.

Further, with reference to FIG. 3, the first layer is formed in such a manner as to contain plural pieces of the machining information. In other words, numbers for specifying the machining program and the coordinate systems as the machining information are displayed. The display command part 22 transmits, a command of superposing the plural second layers on the first layer and displaying the same, to the display part 28 so as to correspond to each pieces of machining information of the first layer, and the display part 28 displays the layer based on the command. In the example as illustrated in FIG. 3, the description images 48b, 48c associated with the coordinate systems are displayed in addition to the description image 48a associated with the machining program. Thus, when the first layer contains images of plural pieces of the machining information, the second layer containing description images corresponding to each machining information can be displayed.

As the machining information contained in the first layer, at least one of the machining program, a number for specifying the machining program, a reference point of the workpiece coordinate system, the tool information, and an inspection item of the workpiece can be included. As the machining information, which is not limited to such a configuration, arbitrary information associated with machining of the workpiece can be employed. For example, the machining information can include information of a coolant used in the machine tool.

Note that with reference to FIG. 1, as to input of the initial machining information into the input part 71 of the control device 70, an electronic file containing various pieces of information may be inputted into the input part 71 in addition to input of the machining information by the operation of the operator through the operation part 30.

Next, with reference to FIG. 10 to FIG. 13, an embodiment with respect to a method of inputting an image into the second layer and the third layer will be described. The control device according to the present embodiment is formed in such a manner that an arbitrary person such as the operator, the supervisor, or the programmer can input a desired description image in advance. In the first layer, a format containing the machining information is stored in advance in the storage part 26. The first layer generation part 21a generates the first layer in accordance with the format as stored in advance.

Figure 10:
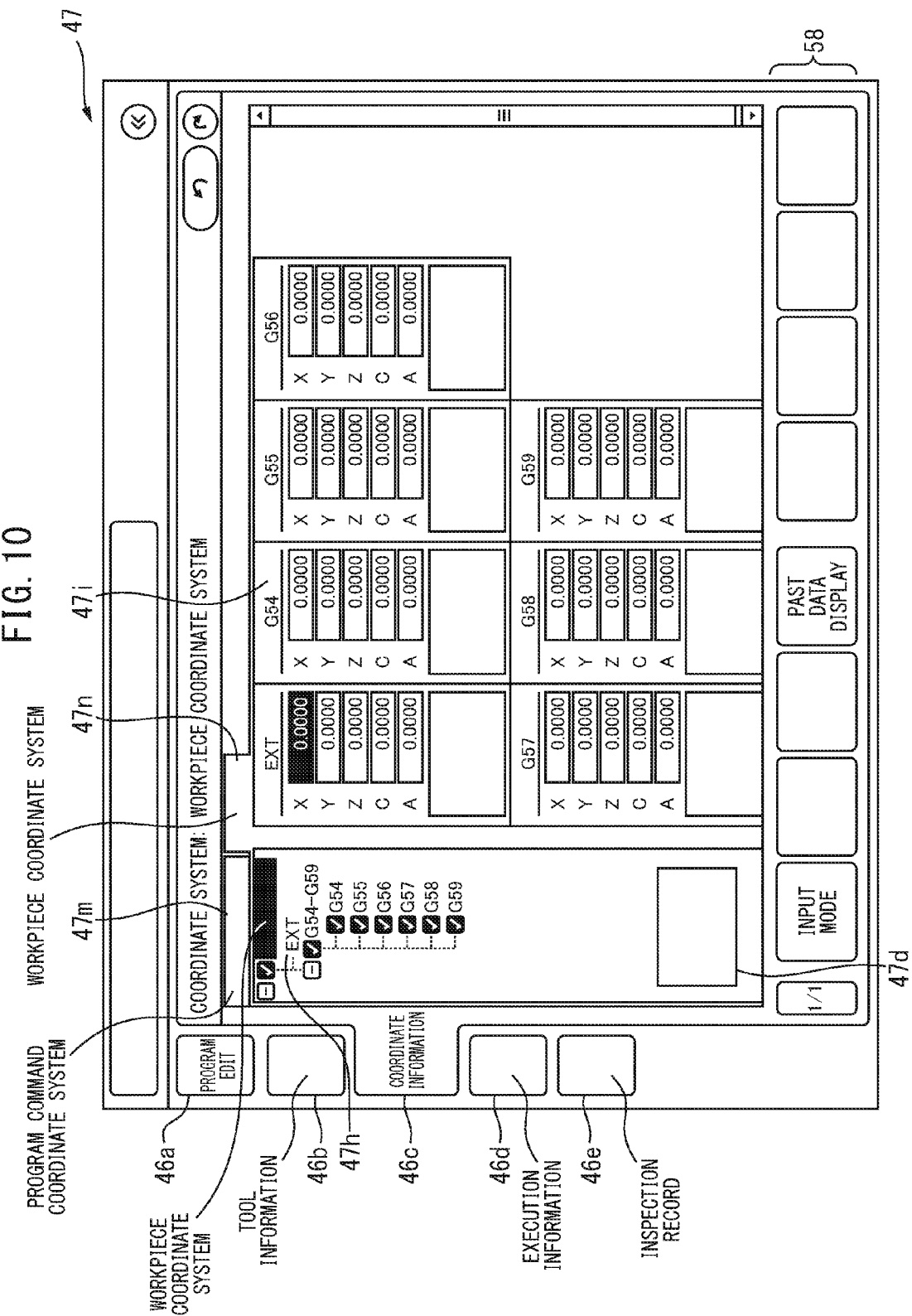
FIG. 10 is an explanatory diagram of first process of inputting a description image into the second layer and the third layer.

FIG. 10 shows an explanatory diagram of first process of inputting an image into the second layer and the third layer. Herein, the coordinate information picture 47 will be described among the pictures selected by the tabs 46a-46e by way of example. The tab 47n of the workpiece coordinate system is selected between the tab 47m of a program command coordinate system and the tab 47n of the workpiece coordinate system. In a display area 47h, a picture for selecting the workpiece coordinate system stored in the storage part 26 is displayed. In a display area 47i, a picture for inputting a numerical value into each coordinate system of the workpiece coordinate system as selected in the display area 47h is displayed. Herein, an example of inputting the description image 48a displayed in the image area 47d of the coordinate information picture 47 will be described. First, a second layer edit picture for creating or editing the second layer is displayed by double clicking (tapping), right clicking, or long pushing an area of the image area 47d.

Figure 11:
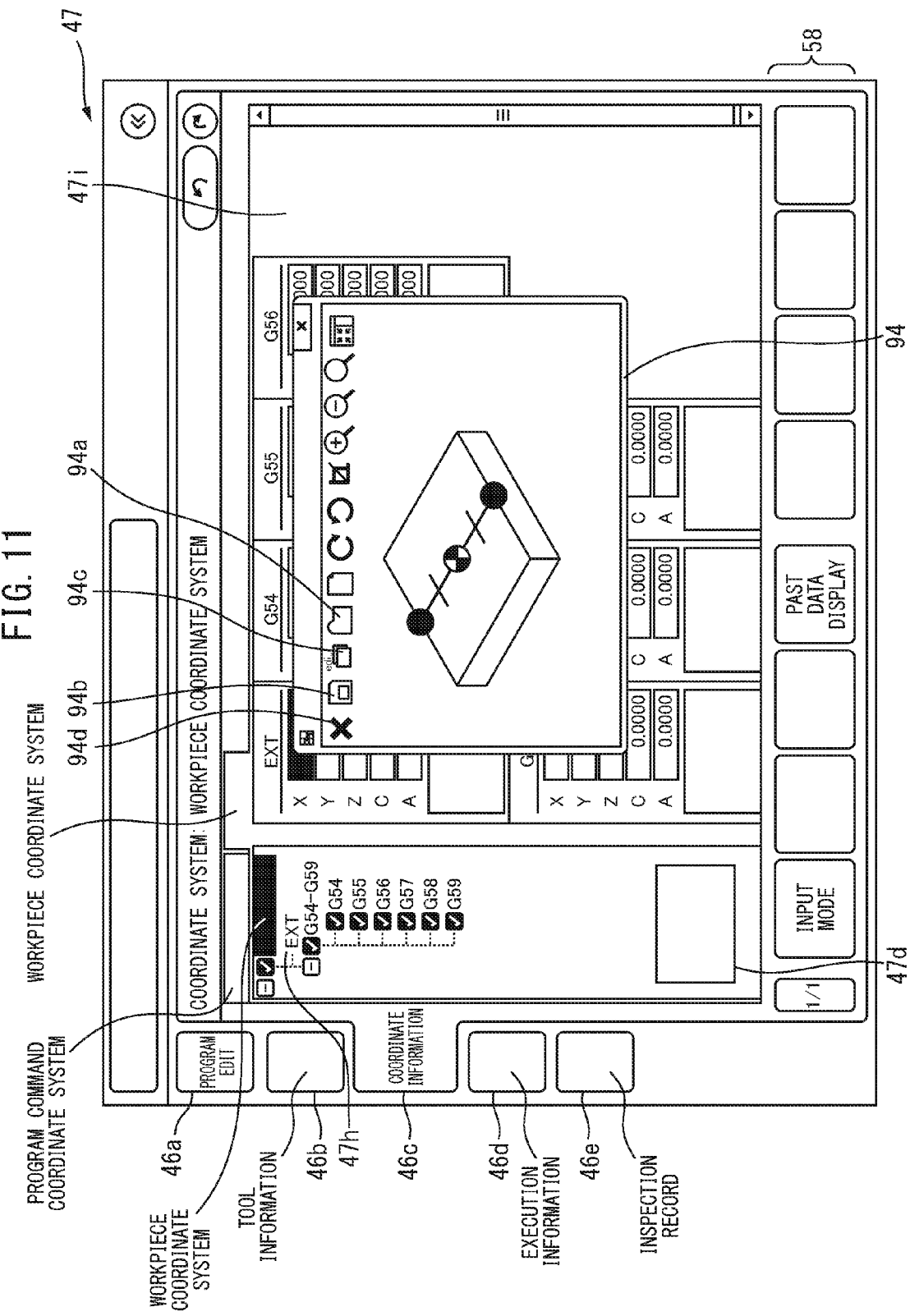
FIG. 11 is an explanatory diagram of second process of inputting the description image into the second layer and the third layer.

FIG. 11 shows an explanatory diagram of second process of inputting an image into the second layer and the third layer. A second layer edit picture 94 is superposed on the first layer to be displayed. An arbitrary image stored in the storage part 26 of the control device 70 can be called by pushing a button 94a of the second layer edit picture 94. A desired image can be displayed in the second layer edit picture 94 and also an image can be inputted into the second layer. Next, the second layer as generated can be stored in the storage part 26 of the control device 70 by pushing a button 94b.

Next, an image is inputted into the third layer. A third layer edit picture for generating or editing the third layer is displayed by pushing a button 94c.

Figure 12:
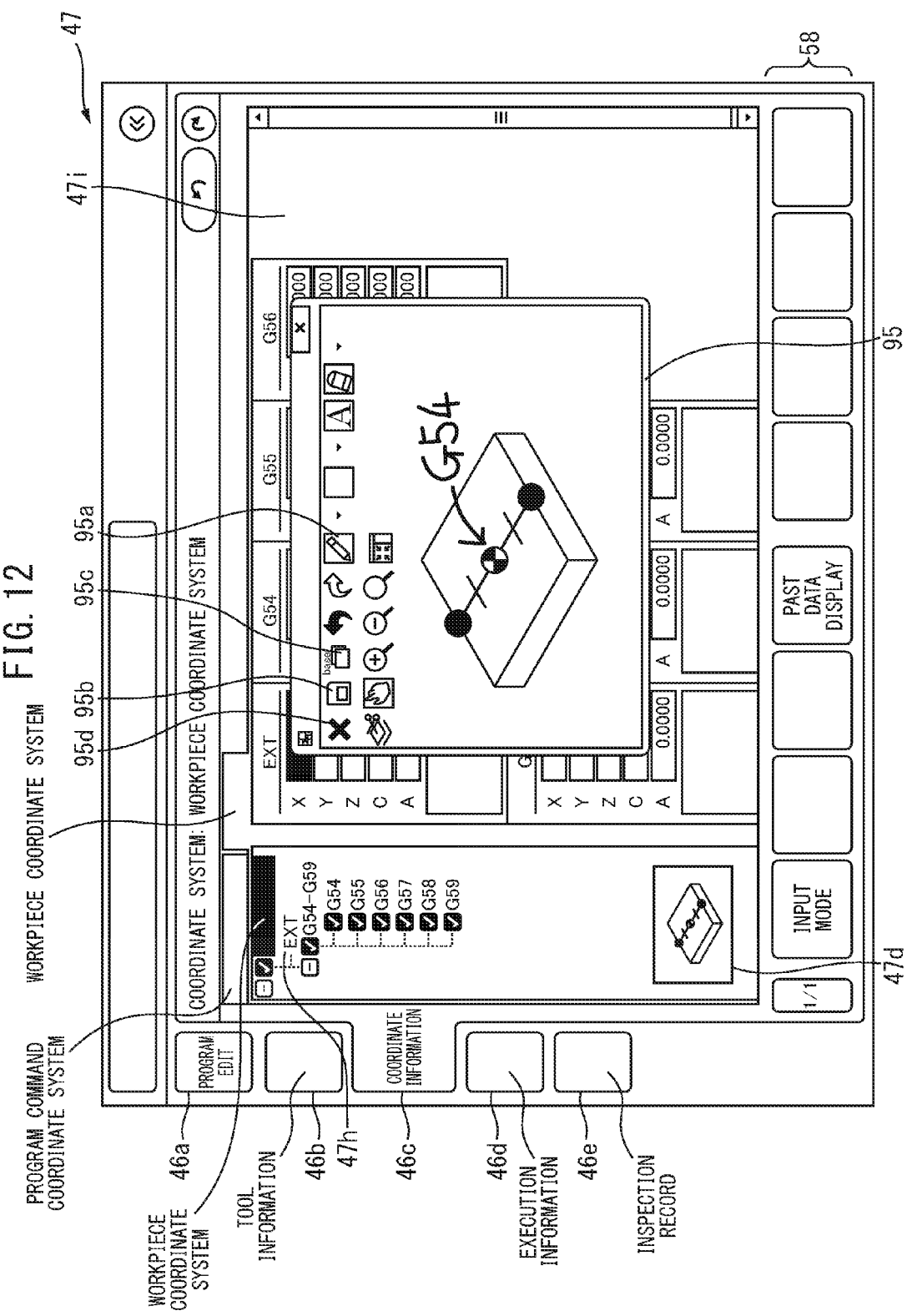
FIG. 12 is an explanatory diagram of third process of inputting the description image into the second layer and the third layer.

FIG. 12 shows an explanatory diagram of third process of inputting an image into the second layer and the third layer. A third layer edit picture 95 is superposed on the first layer to be displayed. In the third layer edit picture 95, the image of the second layer is displayed. By pushing a button 95a and then writing a desired character on the display panel 45, information on arbitrary characters, figures and the like can be entered by handwriting. Herein, G54 is entered by handwriting. Note that a handwritten character may be inputted from the key input part 42.

The third layer can be stored in the storage part 26 of the control device 70 by pushing a button 95b. Thus, a handwritten note can be inputted into the third layer. Note that the picture returns to the second layer edit picture 94 by pushing a button 95c and editing the image of the second layer can be performed again.

After the second layer and the third layer are stored, in the second layer edit picture 94 or the third layer edit picture 95, these layer edit pictures can be closed by pushing buttons 94d, 95d.

Figure 13:
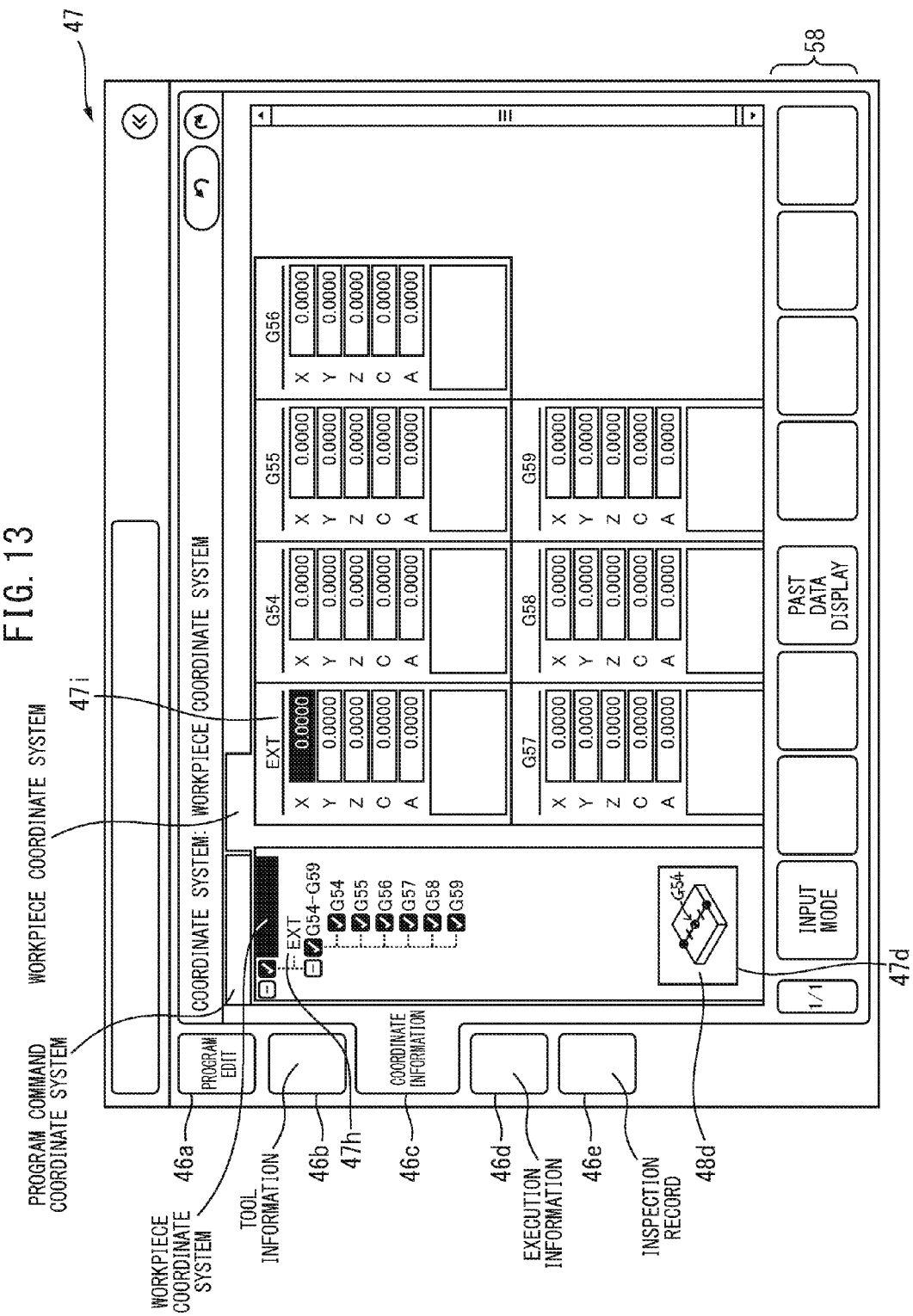
FIG. 13 is an explanatory diagram of fourth process of inputting the description image into the second layer and the third layer.

FIG. 13 shows an explanatory diagram of fourth process of inputting a description image into the second layer and the third layer. A description image 48d inputted in the example is displayed in the image area 47d. The description image input method described above can be applied to input of a description image in an arbitrary picture other than the coordinate information picture 47.

With reference to FIG. 1 and FIG. 6, the storage command part 25 according to the present embodiment transmits a command for individually storing the second layer and the third layer, and the storage part 26 individually stores the second layer and the third layer. The third layer generation part 21c reads a handwritten note of the third layer from the storage part 26 and is formed to be capable of editing an image of the third layer without changing the second layer. By employing such a configuration, handwritten information can be added and an erroneous part can be modified without changing an image such as a photograph of the workpiece in the second layer. Consequently, convenience in editing a description image is improved.

Note that in the control device according to the present embodiment, the second layer and the third layer are individually stored, a configuration of which is not limitative, and an image in which an image of the second layer and an image of the third layer are combined may be stored as an image in the second layer. In other words, the second layer may be an image containing an image such as a figure and a handwritten note as generated in advance.

Further, in the embodiment as described above, the second layer generation part is formed in such a manner as to take an image created in advance into the second layer, a configuration of which is not limitative, but the second layer generation part may be formed in such a manner that a handwritten note can be inputted. For example, in the program edit picture 51 as illustrated in FIG. 7, a configuration may be made in such a manner that a handwritten sentence can be displayed in the image area 51c.

Figure 14:
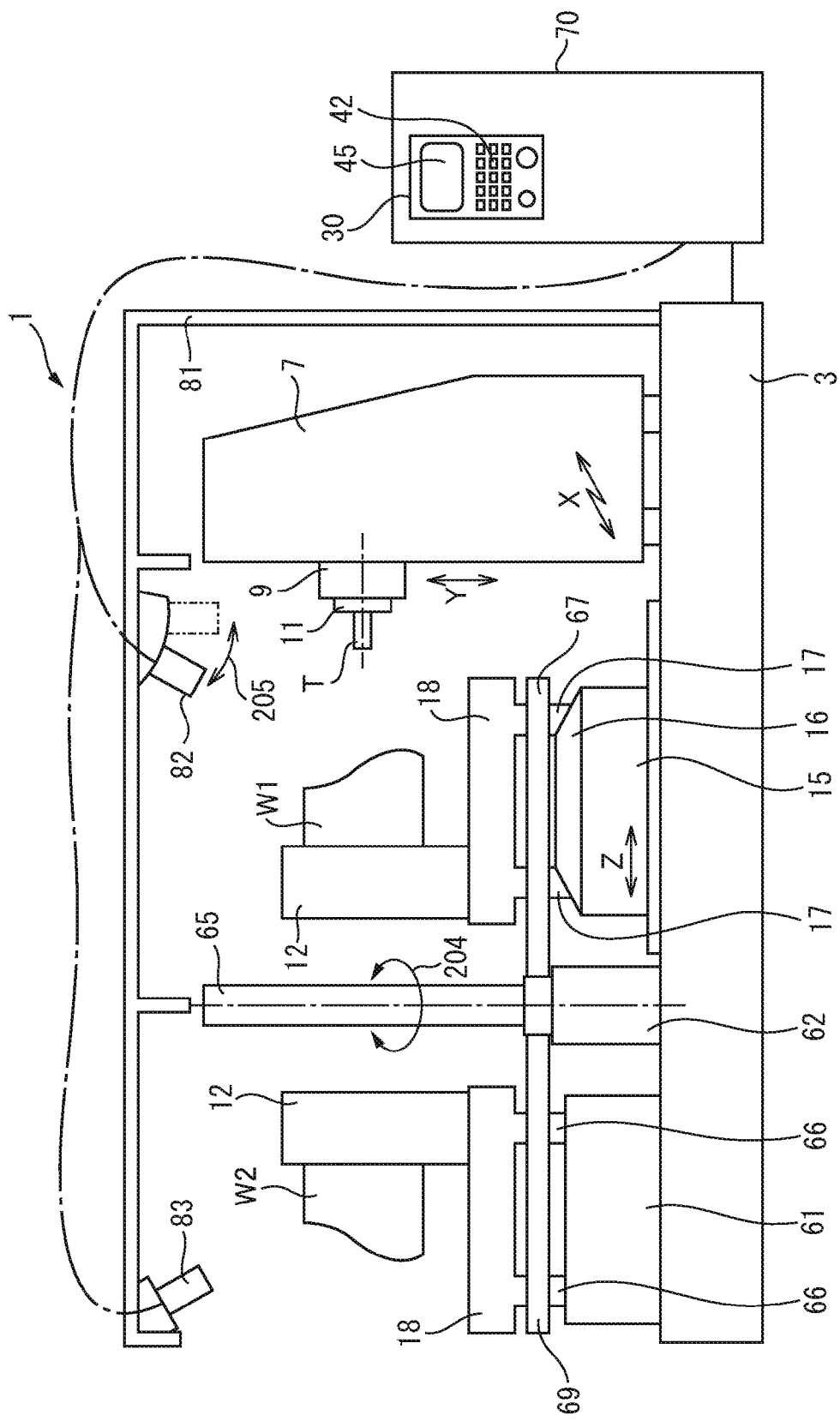
FIG. 14 is a schematic side view of the machine tool according to the first embodiment.

FIG. 14 shows a schematic side view of the machine tool according to the present embodiment. The machine tool 1 comprises a bed 3, a column 7 mounted to an upper surface of the bed 3, and a spindle head 9 mounted to a front surface of the column 7. A spindle 11 is rotatably supported in the spindle head 9. A tool T is fixed to the spindle 11. The machine tool 1 comprises a table base 15 mounted to frontward of the column 7 on the upper surface of the bed 7. A table 16 is disposed on an upper surface of the table base 15. The table 16 supports a pallet 18 through a plurality of pallet clampers 17. The pallet 18 supports a workpiece W1 through a workpiece mounting base 12.

The machine tool 1 includes a movement device which relatively moves the tool T with respect to the workpiece W1 in a direction of each feed axis. The machine tool 1 according to the present embodiment is formed to be capable of moving the tool T in the X-axis direction and the Y-axis direction. Further, the machine tool 1 is formed to be capable of moving the workpiece W1 in the Z-axis direction.

The machine tool 1 includes a workpiece replacement device for replacing the post-machined workpiece W1 with a pre-machined workpiece W2. The workpiece replacement device includes a drive part 62 disposed frontward of the table base 15 and a turning door 65 which is disposed to stand on an upper surface of the drive part 62 and closes an opening of a splash guard. The drive part 62 includes a motor which rotates the turning door 65 about a predetermined rotation axis and a hydraulic cylinder which vertically drives the member along the rotation axis. The workpiece replacement device includes a pair of replacement arms 67, 69 which engage with the drive part 62 and extend in directions opposite to each other.

The workpiece replacement device includes a pallet setup station 61 fixed to the upper surface of the bed 3. The pallet setup station 61 supports the pallet 18 through a pallet clamper 66. The pallet 18 supports the workpiece W2 through the workpiece mounting base 12.

When machining of the workpiece W1 is completed and a replacement command of the pallet 18 is emitted from the control device, the pallet clampers 17, 66 are detached from the pallet 18. The pallet 18 is released from the table 16 and the pallet setup station 61. Next, the drive part 62 operates and the replacement arms 67, 69 ascend. Next, the replacement arms 67, 69 and the turning door 65 rotate by 180° as indicated by an arrow 204. The workpiece W1 and the workpiece W2 rotate. The pallet 18 to which the pre-machined workpiece W2 is attached moves upward of the table 16. The pallet 18 to which the post-machined workpiece W1 is attached moves upward of the pallet setup station 61.

Next, the drive part 62 operates and the replacement arms 67, 69 descend. The pallet 18 to which the pre-machined workpiece W2 is attached is placed on the table 16. Alternatively, the pallet 18 to which the post-machined workpiece W1 is attached is placed on the pallet setup station 61. Next, the pallet clampers 17, 66 engage with the pallet 18, and each pallet 18 is supported by the table 16 or the pallet setup station 61. Subsequently, machining of the pre-machined workpiece W2 can be started. In the pallet setup station 61, a post-machined workpiece can be replaced with a pre-machined workpiece. Thus, the workpiece replacement device according to the present embodiment can automatically replace the workpiece.

The machine tool 1 according to the present embodiment comprises cameras 82, 83 as an image capture device. The cameras 82, 83 are supported by a frame 81. The camera 82 is formed to be rotatable as indicated by an arrow 205 and can be directed into a direction in which the workpiece or the tool is disposed. The camera 82 is disposed in a machining area for machining the workpiece and can capture an image of the workpiece, an image of the tool, or an image of the workpiece as being machined.

The camera 83 is disposed in an area for replacing the workpiece outside the machining area. The camera 83 can capture the pre-machined workpiece W2. In the workpiece replacement device, a waiting position for allowing the pre-machined workpiece to wait during a period of machining of the workpiece W1 in the machining area is determined. The camera 83 according to the present embodiment is formed to be capable of capturing the pre-machined workpiece W2 during waiting at the waiting position. Alternatively, the camera 83 can capture the post-machined workpiece when the post-machined workpiece returns to the waiting position.

With reference to FIG. 1 and FIG. 14, each type of camera 32 connected to the control device 70 in FIG. 1 corresponds to the cameras 82, 83 in FIG. 14. An image of the cameras 82, 83 is inputted into the information input control part 20 by the image acquisition part 33. Note that as the image of the cameras 82, 83, either one of a static image or an animated image may be applicable. Further, an image may be taken from an external camera connected to a USB port of the operation panel 41 in FIG. 2.

The second layer generation part 21b according to the present embodiment can take an image from each type of camera 32 and set the same as an image of the second layer. In other words, the second layer generation part 21b can take an image of the tool T and the workpiece W1 in the machining area or an image of the workpiece W2 disposed outside the machining area, as the image of the second layer, and input the same into the second layer.

Note that the image capture device according to the present embodiment is mounted to the workpiece replacement device, a configuration of which is not limitative, but when the machine tool includes a tool replacement device for replacing the tool, the image capture device may be mounted to the tool replacement device. For example, the image capture device may be formed to be capable of capturing the tool at a waiting position at which the tool waits for replacing the tool.

With reference to FIG. 15 to FIG. 19, the control device of the machine tool according to second embodiment will be described. The machine tool according to the present embodiment has a function of displaying a message board composed of the second layer at an arbitrary time while displaying an arbitrary picture of the first layer.

Figure 15:
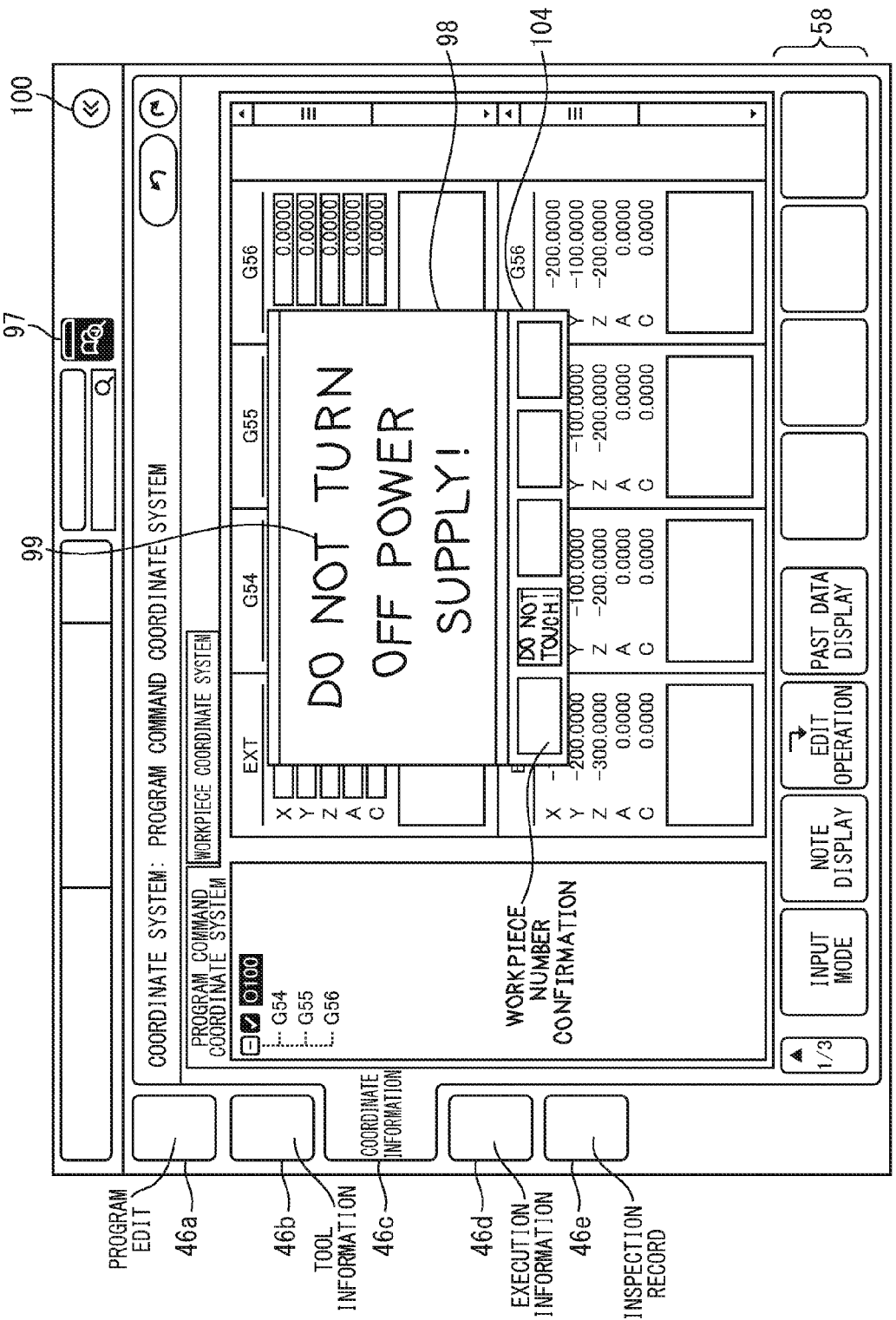
FIG. 15 is a picture in which a message board is displayed in the coordinate information picture according to second embodiment.

FIG. 15 is a picture which describes the message board according to the present embodiment. Even when a picture of any tab among the plurality of tabs 46a-46e is selected, a button 97 is displayed at an upper part of the picture. The operator pushes the button 97 at an arbitrary time, whereby a display area 98 as the message board can be superposed on the first layer to be displayed. In the display area 98, a description image 99 can be displayed. The display area 98 can be closed by pushing the button 97 again.

In an example as illustrated in FIG. 15, a cautionary statement is entered so that a power supply of the machine tool is not turned off when machining is temporarily stopped and the like. Such a display area 98 can be displayed by the second layer. The second layer generation part 21c according to the present embodiment is formed to be capable of inputting a handwritten note into the second layer. Note that, in the display area 98 of the present embodiment, a selection area 104 for displaying a plurality of images is displayed so that the plurality of images can be selected.

Next, a method of inputting a description image 99 into the second layer displayed in such a display area 98 will be described. a button 100 for displaying an auxiliary picture is disposed at an upper side of an arbitrary picture. When the message board is created and edited, the button 100 is pushed so as to display the auxiliary picture.

Figure 16:
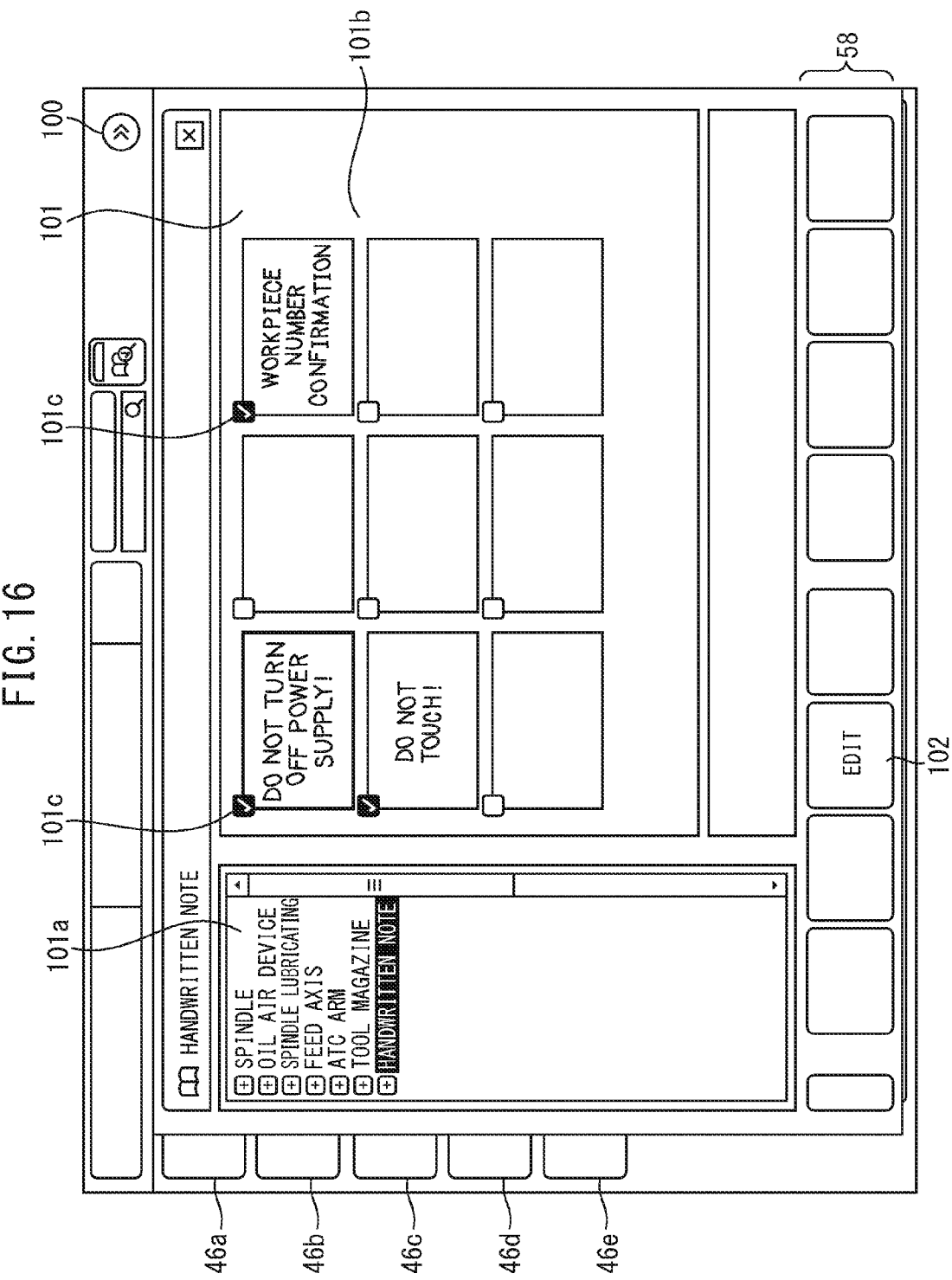
FIG. 16 is an explanatory diagram of first process of inputting the message board according to the second embodiment.

FIG. 16 shows a picture in which an auxiliary picture is displayed. An auxiliary picture 101 includes a display area 101a in which an auxiliary menu is displayed. A handwritten note displayed in the display area 101a is selected. The auxiliary picture 101 includes a display area 101b for displaying a description image stored in the storage part. In the display area 101b, a plurality of images of the second layer are reduced in the size to be displayed. A message board edit picture is displayed by selecting a desired image from the display area 101b and pushing a message edit button 102.

Figure 17:
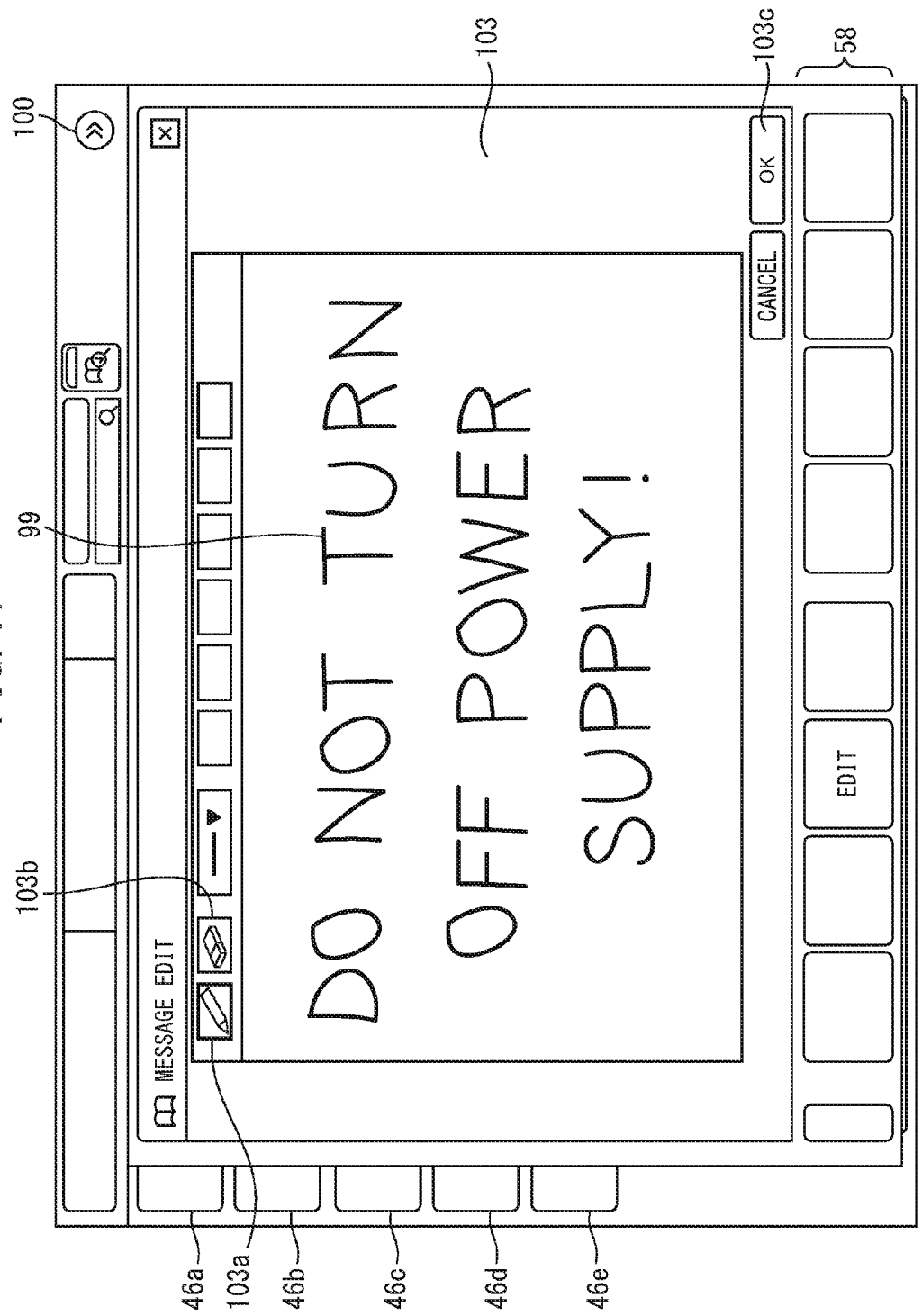
FIG. 17 is an explanatory diagram of second process of inputting the message board according to the second embodiment.

FIG. 17 shows an edit picture of a message board. In a display area 103 as an edit picture, the image as selected of the second layer is displayed. The description image 99 can be edited and new input can be made by pushing buttons 103a, 103b and the like. The edit picture can be closed by pushing a button 103c. With reference to FIG. 16, display of the auxiliary picture 101 can be terminated by pushing the button 100 again.

Note that a selection column 101c is marked in FIG. 16, whereby a selected image can be displayed in a selection area 104 at a lower part of the display area 98 in FIG. 15. The control device according to the present embodiment can store the plurality of second layers. A configuration is made in such a manner that the arbitrary second layer is selected and can be displayed as a message. Further, the display area 98 according to the present embodiment can be enlarged and reduced to an arbitrary size.

In the message board according to the present embodiment, when the operator who operates the machine tool is changed, matters to be transmitted can be displayed. The content desired to be transmitted by the operator at a previous time to the operator at this time can be displayed. Since the operator at this time sees the display part of the operation panel before an operation, failing to communicate matters to be transmitted can be avoided. Alternatively, in the message board, precautions when the operator performs an operation can be entered beforehand. The message board is displayed and confirmation of the precautions and the like can be performed at a desired time during a period of machining the workpiece. In particular, when important matters are displayed, a color of a description image is changed so as to facilitate the attention.

In addition, the control device according to the present embodiment is formed to be capable of displaying a message board containing a predetermined description image at a predetermined time. For example, the control device can have a function of detecting time and date, and can cause the storage part to store time and date of maintenance of the machine tool. When preset time and date come, the display part can display a message which notifies a maintenance time. Alternatively, when a time limit of delivery approaches while the workpiece is machined, the time limit of delivery can be displayed in the message board.

Further, in the control device according to the present embodiment, an M code for displaying a predetermined description image in a display area as a message board is determined. The M code is a code to be entered in the machining program and perform various controls of the machine tool. For example, as the M code to display a message board, M100 can be set. In the machining program, the M code such as "M100 S1", can be entered. Herein, an argument S1 denotes a desired description image. When M100 is detected, the control device can display a message board displaying the description image of the argument S1 quoted in the M code. For example, when an automatic operation is temporarily stopped using the M code during machining of the workpiece by the machine tool, a description image for replacing a jig and a description image for instructing measurement of the size of a hole as formed can be displayed.

Figure 18:
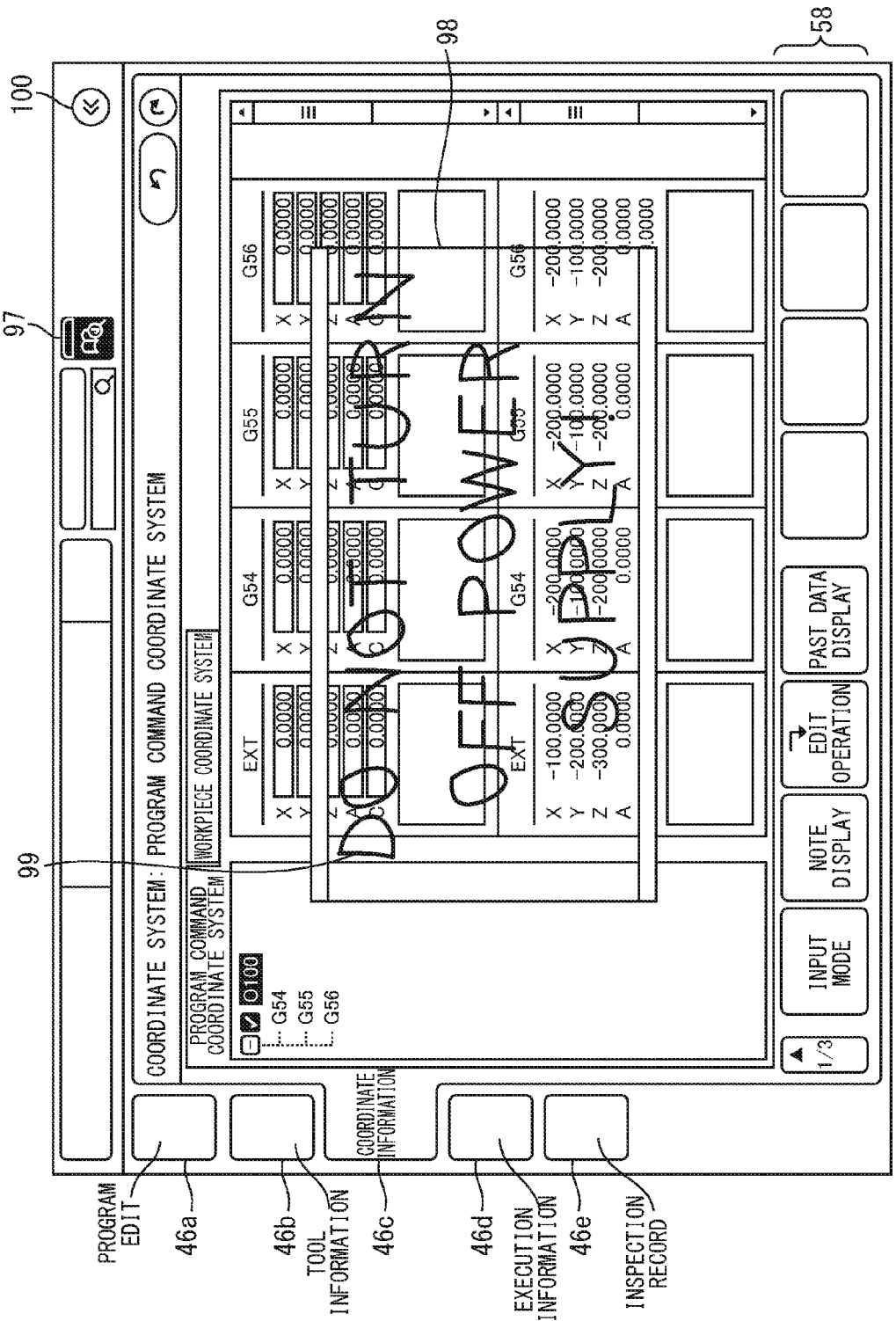
FIG. 18 is a picture in which another message board is displayed in the coordinate information picture according to the second embodiment.
Figure 19:
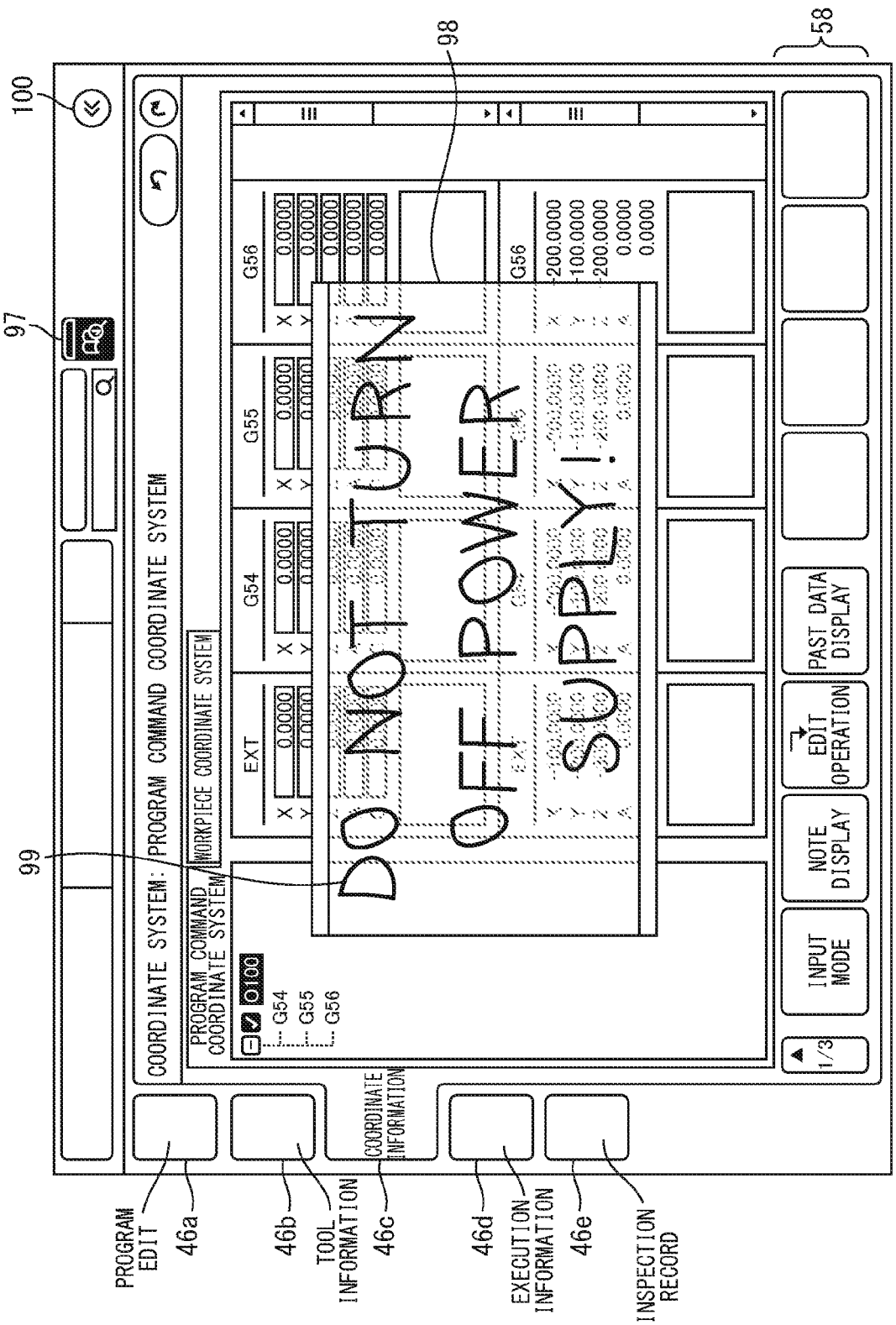
FIG. 19 is a picture in which still another message board is displayed in the coordinate information picture according to the second embodiment.

FIG. 18 shows a picture when the another message board is displayed according to the present embodiment. FIG. 19 shows a picture when still another message board is displayed according to the present embodiment. In another message board as illustrated in FIG. 18, the second layer is made to be transparent to be displayed on the first layer. The display area 98 is transparent. Further, in still another message board as illustrated in FIG. 19, the second layer which is semi-transparent is superposed on the first layer to be displayed. Characters in an image of the first layer become thin. Thus, the message board is made to be transparent or semitransparent to be displayed, whereby also while the display area 98 is displayed, the machining information displayed in the first layer can be confirmed, and further, a message associated with the machining information is left, whereby an operation to be performed by the operator can be adequately communicated.

The other configurations, operations, and effects are similar to those of the first embodiment, and thus description thereof is not repeated herein.

The embodiments as described above can be appropriately combined. In each drawing as described above, the same or equivalent components are denoted with the same reference signs. Note that the embodiments as described above are illustrative and do not limit the invention. Moreover, the embodiments include modifications of the embodiments recited in the claims.

REFERENCE SIGNS LIST

1 Machine tool
21 Layer generation part
21a First layer generation part
21b Second layer generation part
21c Third layer generation part
26 Storage part
28 Display part
29 Manual input part
32 Each type of camera
42 Key input part
45 Display panel
47 Coordinate information picture
47a-47c, 47h, 47i Display area
47d-47f Image area
49a, 49b Image
51 Program edit picture
51a, 51b Display area
51c Image area
53 Tool information picture
53a, 53b Display area
53e Image area
55 Inspection record picture
55a Display area
55e Image area
61 Pallet setup station
62 Drive part
70 Control device
76 Machining program
82, 83 Camera
92 Second layer
93 Third layer
98 Display area

The invention claimed is:
1. A control device of a machine tool which machines a workpiece by relatively moving a tool and the workpiece, the control device of the machine tool comprising:
a display part which displays information associated with a machine tool;

a first layer generation part which generates a first layer containing machining information associated with machining of the workpiece;

a second layer generation part which generates a second layer containing an image associated with the machining information of the first layer; and a third layer generation part which generates a third layer containing a handwritten note; wherein the machining information includes numerical values with respect to a reference point of other coordinate system which differs from a machine coordinate system having a predetermined point of the machine tool as an origin, and the display part superposes an image in which the second layer and the third layer are superposed, on the first layer, and displays the superposed image outside of an area in which the numerical values with respect to the reference point of the other coordinate system are displayed in the first layer.

2. The control device of the machine tool according to claim 1, further comprising a storage part which individually stores the second layer and the third layer, wherein the third layer generation part reads the third layer from the storage part, and is formed to be capable of editing the handwritten note of the third layer.

3. The control device of the machine tool according to claim 1, wherein the machining information includes at least one of a machining program, a number for specifying the machining program, a reference point of a workpiece coordinate system, tool information, and a workpiece inspection item.

4. The control device of the machine tool according to claim 1, further comprising an image capture device disposed to be capable of capturing the workpiece or the tool, wherein the second layer generation part takes an image from the image capture device and inputs the image into the second layer.

* * * * *